(12) United States Patent
Zaretsky et al.

(10) Patent No.: US 7,911,746 B2
(45) Date of Patent: Mar. 22, 2011

(54) GFCI WITH SELF-TEST AND REMOTE ANNUNCIATION CAPABILITIES

(75) Inventors: Albert Zaretsky, Boynton Beach, FL (US); Roger M. Bradley, North Bellmore, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 549 days.

(21) Appl. No.: 11/756,362

(22) Filed: May 31, 2007

(65) Prior Publication Data

US 2008/0007879 A1    Jan. 10, 2008

Related U.S. Application Data

(60) Provisional application No. 60/803,694, filed on Jun. 1, 2006.

(51) Int. Cl.
H02H 9/08 (2006.01)
H02H 3/00 (2006.01)
H03K 17/72 (2006.01)

(52) U.S. Cl. .............................. 361/42; 361/45; 327/439
(58) Field of Classification Search .................... 361/42, 361/45; 327/439
See application file for complete search history.

(56) References Cited

U.S. PATENT DOCUMENTS

| | | | |
|---|---|---|---|
| 1,770,398 A | 7/1930 | Gallop et al. | |
| 1,870,810 A | 8/1932 | Hoard | |
| 1,967,110 A | 7/1934 | Bergvall | |
| 2,309,433 A | 1/1943 | Anderson | |
| 3,252,086 A | 5/1966 | Lundstrom | |
| 3,259,802 A | 7/1966 | Steen | |
| 3,668,474 A | 6/1972 | Knox | |
| 4,274,121 A * | 6/1981 | Howell | 361/96 |
| 4,314,300 A | 2/1982 | Griffith | |
| 4,455,654 A | 6/1984 | Bhaskar et al. | |
| 4,707,759 A | 11/1987 | Bodkin | |
| 4,742,422 A | 5/1988 | Tigges | |
| 4,751,608 A | 6/1988 | Schultz | |
| 5,136,458 A | 8/1992 | Durivage | |
| 5,175,403 A | 12/1992 | Hamm et al. | |
| 5,202,662 A | 4/1993 | Bienwald et al. | |
| 5,214,560 A | 5/1993 | Jensen | |
| 5,270,900 A | 12/1993 | Alden et al. | |
| 5,309,310 A | 5/1994 | Baer et al. | |

(Continued)

FOREIGN PATENT DOCUMENTS

CA    2383738    7/2000

(Continued)

OTHER PUBLICATIONS

International Search Report dated Feb. 12, 2008.

(Continued)

*Primary Examiner* — Stephen W Jackson
*Assistant Examiner* — Zeev Kitov
(74) *Attorney, Agent, or Firm* — Collard & Roe, P.C.

(57) ABSTRACT

Methods and techniques are disclosed for an intelligent GFCI device (IGFCI) having a microcontroller programmed to perform self-testing on a periodic basis and communicate the results of this testing to a remote monitoring device such as a remote central logging computer. In some implementations, with two-way (bidirectional) communication, a plurality of self-testing IGFCI devices can be tested and reset systematically from a remotely located device to reduce disruption to users. The IGFCI device can be configured to be automatically reset or manually reset upon the application of AC power to the device.

20 Claims, 17 Drawing Sheets

U.S. PATENT DOCUMENTS

| | | | |
|---|---|---|---|
| 5,363,047 A * | 11/1994 | Dresti et al. | ............... 324/510 |
| 5,386,183 A | 1/1995 | Cronvich et al. | |
| 5,418,678 A | 5/1995 | McDonald | |
| 5,475,609 A | 12/1995 | Apothaker | |
| 5,477,412 A | 12/1995 | Neiger et al. | |
| 5,600,524 A | 2/1997 | Neiger et al. | |
| 5,715,125 A | 2/1998 | Neiger et al. | |
| 5,784,753 A | 7/1998 | Kaczmarz et al. | |
| 5,825,599 A | 10/1998 | Rosenbaum | |
| 5,875,087 A * | 2/1999 | Spencer et al. | ............... 361/87 |
| 5,956,218 A | 9/1999 | Berthold | |
| 5,969,920 A | 10/1999 | Mackenzie | |
| 5,978,191 A | 11/1999 | Bonniau et al. | |
| 5,982,593 A | 11/1999 | Kimblin et al. | |
| 6,052,265 A * | 4/2000 | Zaretsky et al. | ............... 361/42 |
| 6,052,266 A | 4/2000 | Aromin | |
| 6,111,733 A | 8/2000 | Neiger et al. | |
| 6,169,405 B1 | 1/2001 | Baltzer et al. | |
| 6,191,589 B1 | 2/2001 | Clunn | |
| 6,253,121 B1 | 6/2001 | Cline et al. | |
| 6,262,550 B1 * | 7/2001 | Kliman et al. | ............... 318/565 |
| 6,262,871 B1 | 7/2001 | Nemir et al. | |
| 6,292,337 B1 | 9/2001 | Legatti et al. | |
| 6,370,001 B1 | 4/2002 | Macbeth | |
| 6,421,214 B1 | 7/2002 | Packard et al. | |
| 6,421,618 B1 * | 7/2002 | Kliman et al. | ............... 702/58 |
| 6,426,632 B1 | 7/2002 | Clunn | |
| 6,426,634 B1 | 7/2002 | Clunn et al. | |
| 6,433,977 B1 | 8/2002 | Macbeth | |
| 6,437,700 B1 | 8/2002 | Herzfeld et al. | |
| 6,456,471 B1 | 9/2002 | Haun et al. | |
| 6,502,265 B2 | 1/2003 | Blair et al. | |
| 6,522,510 B1 | 2/2003 | Finlay et al. | |
| 6,532,424 B1 | 3/2003 | Haun et al. | |
| 6,538,863 B1 | 3/2003 | Macbeth | |
| 6,674,289 B2 | 1/2004 | Macbeth | |
| 6,683,158 B2 | 1/2004 | Springer et al. | |
| 6,789,209 B1 | 9/2004 | Suzuki et al. | |
| 6,807,035 B1 | 10/2004 | Baldwin et al. | |
| 6,807,036 B2 * | 10/2004 | Baldwin | ............... 361/42 |
| 6,831,819 B2 | 12/2004 | Nemir et al. | |
| 6,856,498 B1 | 2/2005 | Finlay, Sr. | |
| 6,864,766 B2 | 3/2005 | DiSalvo et al. | |
| 6,873,158 B2 | 3/2005 | Macbeth | |
| 6,888,708 B2 * | 5/2005 | Brungs et al. | ............... 361/42 |
| 6,980,005 B2 | 12/2005 | Finlay, Sr. et al. | |
| 7,133,266 B1 | 11/2006 | Finlay | |
| 7,149,065 B2 | 12/2006 | Baldwin et al. | |
| 7,173,428 B2 | 2/2007 | Hurwicz | |
| 7,173,799 B1 | 2/2007 | Weeks et al. | |
| 7,177,129 B2 | 2/2007 | Arenz et al. | |
| 7,195,500 B2 | 3/2007 | Huang et al. | |
| 7,212,386 B1 | 5/2007 | Finlay, Sr. et al. | |
| 7,253,629 B1 | 8/2007 | Richards et al. | |
| 7,265,956 B2 | 9/2007 | Huang | |
| 7,268,559 B1 | 9/2007 | Chen | |
| 7,282,921 B2 | 10/2007 | Sela et al. | |
| 7,289,306 B2 | 10/2007 | Huang | |
| 7,295,415 B2 | 11/2007 | Huang et al. | |
| 7,312,964 B2 * | 12/2007 | Tchernobrivets | ............... 361/42 |
| 7,315,437 B2 | 1/2008 | Bonilla et al. | |
| 7,372,678 B2 | 5/2008 | DiSalvo et al. | |
| 2002/0078511 A1 | 6/2002 | Blair et al. | |
| 2002/0181175 A1 | 12/2002 | Baldwin et al. | |
| 2004/0252425 A1 | 12/2004 | Baldwin et al. | |
| 2005/0036250 A1 | 2/2005 | Asano | |
| 2005/0063109 A1 | 3/2005 | Baldwin | |
| 2005/0264427 A1 | 12/2005 | Zeng et al. | |
| 2006/0125622 A1 | 6/2006 | Baldwin et al. | |
| 2007/0014068 A1 | 1/2007 | Huang et al. | |
| 2007/0086127 A1 | 4/2007 | Huang | |
| 2007/0091520 A1 | 4/2007 | Angelides et al. | |
| 2007/0165342 A1 | 7/2007 | Elms | |
| 2007/0208520 A1 | 9/2007 | Zhang et al. | |
| 2007/0227506 A1 | 10/2007 | Perryman et al. | |
| 2007/0279814 A1 | 12/2007 | Bonilla et al. | |
| 2008/0002313 A1 | 1/2008 | DiSalvo et al. | |
| 2008/0007879 A1 | 1/2008 | Zaretsky et al. | |
| 2008/0013227 A1 | 1/2008 | Mernyk et al. | |
| 2008/0022153 A1 | 1/2008 | Wang et al. | |
| 2009/0040667 A1 | 2/2009 | Disalvo et al. | |
| 2009/0086389 A1 | 4/2009 | Huang et al. | |
| 2009/0086390 A1 | 4/2009 | Huang | |
| 2009/0161271 A1 | 6/2009 | Huang et al. | |

FOREIGN PATENT DOCUMENTS

| | | |
|---|---|---|
| WO | WO/00/14842 | 3/2000 |
| WO | WO/2009/097469 | 8/2009 |

OTHER PUBLICATIONS

Office Action for Mexican Patent Office Mexican Application MX/a/2008/015294 Sent Sep. 2, 2010 (Explanation in English Attached).

* cited by examiner

GFCI WITH SELF-TEST AND REMOTE ANNUNCIATION CAPABILITIES

This application claims the benefit of priority pursuant to 35 U.S.C. 119(e) from a U.S. Provisional Application having Application No. 60/803,694 filed Jun. 1, 2006.

BACKGROUND OF THE INVENTION

1. Field of the Invention

This invention relates to resettable circuit interrupting devices, and more particularly to a ground fault circuit interrupter (GFCI) device with self-test and remote annunciation capabilities.

2. Description of the Related Art

Ground fault circuit interrupters (GFCIs) were developed to meet a need for a device that is capable of detecting abnormal current flow (typically from phase to ground) and consequently interrupt power to the electrical system in which the fault occurred. In such a manner the device protects persons from electric shock, fire etc. Detection of ground fault currents in the order of milliamps may be detected, concurrent with load currents such as 10 to 100 amps. Thus, in the absence of a ground fault, the GFCI can enable connection of alternating current (AC) power to downstream electrical loads and receptacle outlets. When a ground fault is detected, the GFCI can open contacts to disconnect the AC power to the load.

When a ground fault is detected, a GFCI can interrupt both phase and neutral lines. Users are thus protected from phase to ground faults even if the phase and neutral wires are inadvertently switched. However miswiring of the GFCI can cause a loss of protection for some receptacles (wall outlets). Receptacle GFCIs can be wired to protect a "single outlet," or they can be wired as "through" devices to protect the face outlet of the GFCI and outlets downstream. In new construction GFCIs will typically be installed prior to electricity being applied. This can result in a possible miswiring, as the wiring box contains two pairs of phase and neutral wires which are not easily identifiable as line and load. Consequently, there is a possibility that an installer might inadvertently connect the line side of the AC wiring to the load side of the GFCI which may create a potential hazard.

In addition to miswiring, GFCIs also may be subject to other failure modes. These failure modes may be caused by abnormal operating conditions such as poor AC supply quality, misuse or chemical action upon the GFCIs parts. To ensure reliable operation, GFCI devices can incorporate a TEST button, on the exterior of the GFCI device, that when pressed, causes the contacts to open and power is removed from the electrical circuit protected by the GFCI. Following a test, the GFCI can be reset to its normal operating condition by pressing a RESET button, on the exterior of the GFCI that, when pressed, simulates a ground fault. This simulated ground fault causes the internal circuitry to respond as if a real ground fault has occurred. Internal components, circuitry and mechanical mechanisms are thereby exercised and tested. If the internal mechanisms of the GFCI are working correctly, the circuit interrupter contacts close and power is restored to the receptacles. Users may be instructed to test the GFCI periodically and replace devices that fail. However, users may not test their GFCIs on a regular basis, if at all, even when visible instructions are placed on the GFCI itself.

GFCI reliability also may be compromised by a power outage and the corresponding surge when power is restored. Power restoration can cause large electrical spikes of voltage and current to appear on the power line, thus creating a possibility of GFCI component failure. Therefore, a GFCI should be tested subsequent to power restoration.

Commercial buildings and industrial/administrative complexes, with multiple floors generally may have many GFCIs. For example, GFCIs may be located in bathrooms, at utility sinks, kitchen areas and outside receptacle outlets. Multiple building complexes such as a campus, a government building complex, corporate center etc. can have hundreds of such GFCI areas for protection of personnel from shock hazards. Testing of GFCIs to ensure proper function may present a logistical problem when testing a large number of GFCIs, for example in a large building or industrial/administrative complex. If a sufficient number of GFCIs are involved, personnel may be permanently employed to press the TEST and RESET buttons on GFCI's and ensure that all the GFCI's are tested on a regular basis, such as monthly. Also the recording of which GFCIs have been tested, and which have not, can become a large undertaking prone to errors and miscommunication.

To assure protection of personnel from shock hazards due to ground faults, GFCIs in residential and commercial environments must be correctly installed and GFCI regularly tested.

SUMMARY OF THE INVENTION

Methods and techniques are disclosed for an intelligent GFCI device (hereinafter IGFCI) having a microcontroller programmed to perform self-testing on a periodic basis and communicate the results of this testing to a remote monitoring device such as a remote central logging computer. In some implementations, with two-way (bidirectional) communication, a plurality of self-testing IGFCI devices can be tested and reset systematically from a remotely located device to reduce disruption to users. The IGFCI device can be configured to be automatically reset or manually reset upon the application of AC power to the device. In the automatic reset implementation, the IGFCI is automatically reset by closing the relay contacts upon application of AC power. In the manual reset implementation, the IGFCI has to be manually reset by the user or by the microcontroller circuit before the IGFCI can be operational.

In one embodiment, the IGFCI device can include a GFCI circuit for handling a fault condition and an intelligent circuit based on a microcontroller or other processor circuit. The GFCI circuit includes a fault sensing/detecting circuit to make and break a conductive path between line and load sides of a power line in response to a fault condition such as a ground fault. The GFCI circuit also includes self-test functionality comprising a test means, such as a test button, to break the conductive path and a reset means, such as a reset button, to reestablish the conductive path. The intelligent circuit can initiate the self-test function and communicate the results of the test to a remote device. The IGFCI comprises a communication circuit configured to operate according to a communication technique such as powerline carrier techniques. The intelligent circuit, which is independent of the GFCI circuit, can be used with any resettable circuit-interrupting device that can be reset. Examples of resettable circuit interrupting devices that can be used with the IGFCI device of the present invention include, but is not limited to, an appliance leakage circuit interrupter (ALCI), an equipment leakage circuit interrupter (ELCI), a resettable immersion detection circuit interrupter (IDCI), an arc-fault circuit interrupter (AFCI) and combination AFCI/GFCI.

The microcontroller can be programmed using software to control the communication circuit and self-test circuit of the IGFCI. The microcontroller can annunciate (transmit) the occurrence of a timer event, such as a 30-day timer, to test the GFCI circuit to a remote central logging computer. The self-test circuit can be enabled by the microcontroller to initiate a self-test of the GFCI. For example, the microcontroller can simulate a ground fault by performing a self-test operation that includes opening and closing the relay contacts of the GFCI for a period of time including a number of AC cycles, such as two AC cycles or less, depending on the contact open/close requirements. The time period for closing and opening the main contacts and the unique address of the GFCI as well as other information or status can be annunciated (transmitted) to the remote central logging computer.

The microcontroller can include software to enable local annunciators when power is first applied to the GFCI and a user test sequence (test button and reset button routine) is executed. Local annunciators can include visual indicator devices (e.g., LED) and/or audible indicator devices (e.g., piezo buzzer). In addition, the software can analyze various relay contact conditions. A ground fault condition can be determined by an interrupt routine which is generated by sensing relay contact opening without the occurrence of a previous power OFF condition or 30-day timer interrupt. Transfer to a ground fault program can then occur which, in turn, can enable various output ports until a clearing routine for resetting the GFCI is recognized. The 30-day timer or other internal interval can be generated by incrementing the contents of a memory address each time a 60 AC cycle impulse is received through an input port. Other features included built-in-test (BIT) techniques to test circuits and components of the IGFCI. For example, a relay coil can be tested by passing a small current through the coil and monitoring the current through the relay coil, which tests the coil for continuity without opening the contacts.

The IGFCI can activate the local annunciators to provide an audible and visual warning upon detection of a miswiring condition or a failure to test the GFCI within a 30-day period. In applications with many GFCIs, the IGFCI can provide for monitoring and testing of the GFCIs from a remote central logger. The IGFCI device can detect the presence of voltage on either the line side or load side of the relay contacts of the GFCI circuit. The microcontroller, under program control, can continuously scan inputs and make decisions such as when a 30-day time interval has occurred and therefore enable the local annunciators.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features and advantages of the present invention will become more fully apparent from the following detailed description, the appended claim, and the accompanying drawing in which similar elements are given similar reference numerals wherein:

DETAILED DESCRIPTION

The present disclosure describes methods and techniques to automatically test one or more GFCIs and subsequently communicate (annunciate) the results to a remote central logger for record purposes, thus obviating the need for time consuming manual testing. The GFCI includes a microcontroller which provides self-test and remote communication capability, hereinafter referred to as an Intelligent GFCI (IGFCI). The self-test function can be configured as an automatic reset or manual reset and the remote communication feature can be configured as one-way (unidirectional from the GFCI) or two-way (bidirectional). The self-test function and remote communication features can be implemented independently. The IGFCI device can be configured to be automatically reset or manually reset upon the application of AC power to the device. In the automatic reset implementation, the IGFCI is automatically reset by closing the relay contacts upon application of AC power. In the manual reset implementation, the IGFCI has to be manually reset by the user or by the microcontroller circuit before the IGFCI can be operational.

Figure 1:
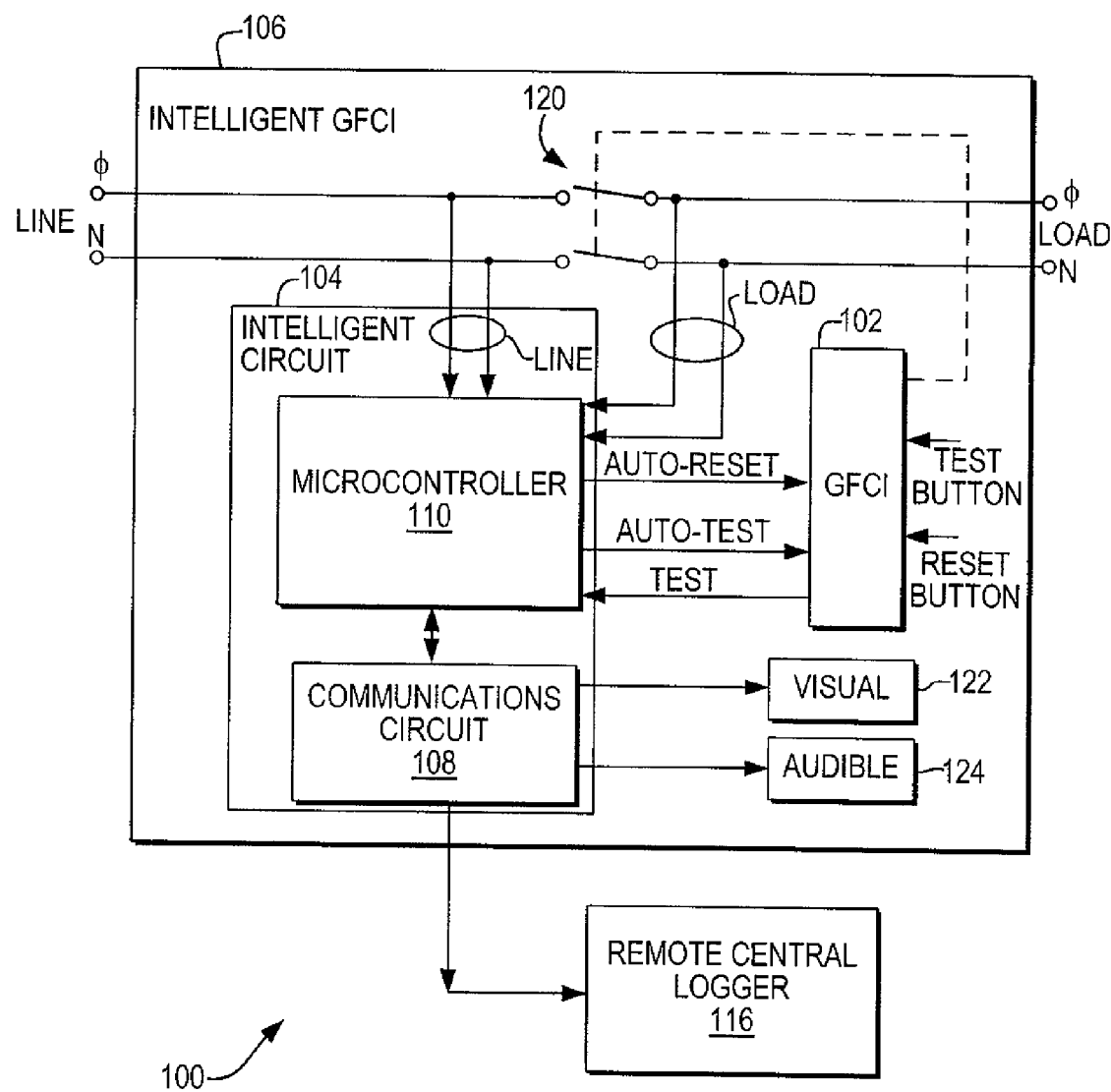
FIG. 1 is a block diagram of an intelligent ground fault circuit interrupter (IGFCI) having self-test and communications capabilities, according to an embodiment of the invention.

FIG. 1 illustrates a block diagram 100 of an implementation of a self-testing and remote annunciating IGFCI device 106 capable of communicating with a remote central logger 116, which is not part of the invention. The IGFCI device 106 includes a GFCI 102 coupled to power-interrupting relay contacts 120 to make and break a conductive path between line and load sides of a power line. For example, upon the occurrence of a ground fault condition or the depression of a TEST button, the GFCI can break the conductive path by opening the relay contacts and disconnecting the line side from the load side. This is often referred to as tripping the GFCI. The GFCI 102 also includes a RESET button which allows a user to reset the device by closing the relay contacts thereby reestablishing the conductive path. The IGFCI 106 includes an intelligent circuit 104 with a microcontroller 110 or other processor capable of being programmed to execute software or other instructions to control the operation of the IGFCI 106. The microcontroller 110 receives a TEST signal from the GFCI to determine the status of the TEST button and LINE signals and LOAD signals derived from the line side and load side power signals respectively to determine the status of the relay contacts 120. As explained in detail below, based on the status of these signals, the microcontroller 110 performs a self-test operation on the GFCI 102 by sending AUTO-RESET and AUTO-TEST signals to the GFCI. The microcontroller 110 includes local annunciating means such as a visual indicator 122 (e.g., LED) and audible indicator 124 (e.g., piezo buzzer device) to provide a user with information and/or status regarding the GFCI.

The microcontroller 110 can include software routines to implement the self-test function. In one embodiment, the microcontroller 110 maintains a software based timer, such as a 30-day timer, to initiate the self-test function. Upon receipt of a signal from the timer, a software subroutine can be enabled that includes executing a self-test routine with the following sequence of steps. First, the micro controller 110 sends a signal to the GFCI to close the relay contacts 120 of the GFCI. In one embodiment, a semiconductor switch, in parallel with a manual test button, is energized by a signal from the microcontroller output port. Next, the microcontroller senses whether the contacts 120 are open for a duration such as one to two AC cycles of the line voltage. Two cycles of open line voltage is unlikely to have an effect on any load. The microcontroller then senses for closed relay contacts 120. Each of the events in the self-test sequence (30 day timer, closed contacts, open contacts, closed contacts) and a unique address of the particular GFCI are annunciated (transmitted), by transmitting a coded packet of information through a communications circuit 108 to the remote central logger 116. The central logger 116 may be part of a central computer system. The coded packet can include the GFCI address and the result(s) of the testing sequence. The address of each GFCI may be set by a dual-inline-package (DIP) switch or soldered links, for example.

The intelligent circuit 104 is configured according to a "polled input" scheme, whereby the state of the circuit's inputs are polled whenever the circuit receives a certain signal and appropriate action is taken depending on the state of the inputs. As described in detail below, the polled inputs include a TEST signal derived from a test circuit, and LOAD and LINE signals derived from the respective load and line inputs of the IGFCI. The line side neutral conductor of the IGFCI is used as a ground (GND) reference so that the microcontroller polls the inputs on the positive going voltage (+ve) edge of the AC power cycle.

In one embodiment, the GFCI 102 includes a continuous duty relay. The power-interrupting contacts 120 are part of the relay that is normally active and maintains the AC power-interrupting contacts closed. The current to the relay coil can be provided through an electronic switch, such as high voltage transistor. When the GFCI detects a ground fault, it triggers an electronic latch, such as a silicon controlled rectifier (SCR) (not shown), to conduct current which turns off the electronic switch thus de-energizing the relay coil and opening the power-interrupting contacts 120.

When testing of the GFCI is required, the intelligent circuit 104 sends a signal to the GFCI 102 to energize (turn on) the relay which closes relay contacts which are in parallel with a test button of the GFCI which causes the relay contacts to open. Thereafter, the reset sequence is started. This produces a simulated ground fault, causing the GFCI circuit to trigger the electronic latch and close the power-interrupting contacts. Thus, all the electrical and mechanical parts of the GFCI are tested. The microcontroller circuit 110 confirms that the power-interrupting contacts have opened by polling its inputs. If the contacts are confirmed open, then the microcontroller circuit 110 de-energizes the test circuit relay and turns on a resetting transistor which, in turn, resets the SCR to an un-triggered (i.e., non-conducting) state. When the resetting transistor is turned OFF, the SCR remains un-triggered. This allows the high voltage transistor to turn on, energizing the relay coil and closing the power-interrupting contacts 120. The microcontroller circuit 110 confirms that the contacts have closed by polling its inputs. The testing can be accomplished within a few cycles of the AC power to cause a minimum disruption, if any, to downstream appliances or loads.

The microcontroller 110 provides the flexibility to analyze various conditions related to the operation of the GFCI. For example, ground leakage of appliances often has a known leakage pattern (signature) peculiar to each device type. For instance, a refrigerator leaks current when its "Calrod" heater turns ON while a washing machine may leak ground current when in its wash or rinse cycle. The microcontroller 104 can be configured to analyze the leakage condition including the magnitude and time of leakage at any period during a device's various application modes. This information can be stored in the memory of the microcontroller and continually compared to instantaneous actual values. Any deviation, in addition to tripping a circuit breaker, can be annunciated using a radio frequency (RF) link, for example, to the remote central logger. Also, the duration of a malfunction can be factored in before tripping the GFCI. The microcontroller can also be programmed to annunciate various levels of leakage or absolute current magnitude so that warnings can be issued of impending fault and/or possible fire.

A communications circuit 108 is coupled to the microcontroller circuit 104 to enable communication between the IGFCI 106 and the remote central logger 116. The communications circuit 108 can transmit information, including but not limited to, a 30-day timer signal indicating that it is time to test the GFCI, a self-test signal indicating that a self-test function has been executed, test status signal (success or failure of the self-test function), a ground fault signal indicating the occurrence of ground fault condition, a miswiring signal indicating that the device has been miswired. The communication circuit 108 can be powered from a GFCI power supply (not shown), a microcontroller circuit power supply or other power supply source. In an implementation, the communications circuit 108 may include a transmitter to enable one-way communications from the IGFCI to the central logger or to a transceiver to enable two-way (bidirectional) communications between the IGFCI and the central logger.

The communication circuit 108 can be implemented using power line carrier techniques which can be used for various remote control applications such as lighting controls. Power line carrier techniques involve superimposing a high frequency (relative to the 60 Hz AC power signal) onto the AC line voltage. Power line carrier protocols (i.e., data formats) include X10, Cebus and Echelon. Each of these systems utilize a unique protocol including carrier frequency, bit rate, code format, unique addresses, command list etc. to transmit an action to a remote receiver. The Cebus and Echelon systems are two-way communications protocols, utilizing transceiver circuitry for acknowledgement. The X10 System is a one-way communication protocol.

The communication circuit 108 can be implemented using other communication techniques. For example, radio frequency (RF) transmitters can be used which have a range of over 100 ft., are smaller and consume less power than equivalent power line transmitters. Transmitting a signal through the power line requires relatively high power and large transmit components including a line driving transistor and line isolation output transformer. Thus, using low power RF transmission techniques can reduce the size and packaging requirement of a GFCI. However, a range of 100 ft. may not be sufficient to transmit the data to a logging computer only a few buildings away. In another technique, a transceiver can be located at a central logger, in the center of a building floor for instance. The central transceiver can receive signals from several GFCIs within a specified distance. The transceiver can be a power line or an RF transceiver which can then forward (relay) the signals over a greater distance.

Power line carrier, or Echelon RF or Cebus RF protocols can include circuitry to handle noise sensitivity. Because signals from any one GFCI may be infrequent, enhanced transmit reliability may be obtained by multiple transmissions of each code packet from the GFCI to the transceiver and from the transceiver to the central logger. In addition the central transceiver can include two-way transmission techniques which facilitate signal acknowledgements, further enhancing long distance transmission reliability. A power supply (not shown) can provide the intelligent circuit 104 with power if the AC power contacts 120 are open and the GFCI device is miswired. Alternatively, the communication method can include audio frequency (AF) which is also included within Cebus or Echelon protocols. In addition, in a one-way configuration (transmit only circuit), the microcontroller can include collision avoidance techniques such as generating a random number to prevent multiple GFCIs from attempting to transmit at the same time, although Cebus and Echelon may have provision for collision avoidance.

As explained above, two implementations of a self-testing IGFCI are disclosed. In the automatic reset implementation, the IGFCI is automatically reset by closing the relay contacts upon application of AC power. In the manual reset implementation, the IGFCI has to be manually reset by the user or by the microcontroller circuit before the IGFCI can be operational. In the self-testing versions of the IGFCI disclosed herein, the microcontroller circuit can provide the automatic reset and manual reset functions.

Automatic Reset Implementation

In the automatic reset embodiment, the GFCI is automatically reset by closing the relay contacts upon re-application of AC power. The local annunciators (visual indicator 122 and audible indicator 124) can be included to alert a user to look at a specific IGFCI among several IGFCIs. However, because the IGFCI device includes self-testing functionality it may not be necessary to alert the user to test the device at appropriate intervals. Instead, the annunciators can be activated when the device is miswired, a ground fault occurs or the self-test or user-test fails. The local annunciators also can be used to aid the user in finding a specific IGFCI during set up of the communications between several IGFCIs and a central logger. In an implementation, the positive edge (+ve) of the LINE input is used to time the local audible and/or visual alerts.

The microcontroller can cause audible and visual indication when:
- the device is first powered, or after a period of power outage long enough to reset the microcontroller.
- the 30-day timer times out if the self-test option is not available. If the self-test option is available, then the indicators are activated if the self-test is not completed within a set time.
- the device trips following a ground fault.
- the test button is pressed (if the outputs are not already enabled).

If no change in inputs is detected, the LINE +ve edge can be used to decrement a counter, which can provide timing for the audible and/or visual outputs. If the visual and audible outputs are disabled, then the LINE +ve edge can be used to decrement a series of counters which provide a timeout after 30 days (i.e., by counting the number of +ve edges). If two-way communication is used, the central logger 116 can count the 30 day period and send the IGFCI a command to self-test (or annunciate that the user must test the IGFCI).

If a change in inputs is detected, then the change in input is verified over a number of samples to filter out incorrect inputs due to factors such as noise and contact bounce. When the change in inputs is verified, the intelligent circuit acts dependent upon the new state of the inputs and the previous state. The intelligent circuit acts upon the following changes of input state: TEST, LOAD and LINE. The TEST signal can be half wave when the Test button is not pressed and zero when the button is pressed.

User Test

The IGFCI 106 allows a user to test the GFCI 102. If the intelligent circuit 104 confirms a change in input to TEST, LOAD, LINE to (0,1,1) then the test button has been pressed. The three bit binary pattern (0,1,1) represents the status of TEST, LOAD and LINE signals. The first flag in a test and reset flag sequence is set. The visual and audible outputs are enabled.

If a change in inputs to open contacts (0,1,1) is confirmed, following a test button press, then the first flag in the flag sequence is reset and the second flag is set.

If a change in inputs to closed contacts (1,1,1) is confirmed, with the second sequence flag set, then a third flag is set and the second flag is removed.

Self-Test

The IGFCI 106 provides self-test functionality to test the GFCI 102. The microcontroller turns on its AUTO_TEST signal. If the intelligent circuit 104 confirms a change in input to (0,1,1) then the test circuit relay contacts (in parallel with the test button) have closed. The first flag in the manual test flag sequence is set. The visual and audible outputs also can be enabled.

If a change in inputs to open contacts (0,1,1) is confirmed, following the test circuit relay contacts closing, then the first flag sequence is reset and the second flag is set. The AUTO_TEST signal is turned off. The AUTO_RESET signal is turned on for sufficient time for a SCR (SC1) in the GFCI circuit (see FIG. 2A) to turn off. The AUTO_RESET signal is then turned off.

If a change in inputs to closed contacts (1,1,1) is confirmed, with the second sequence flag set, then a third flag is set and the second flag is removed.

The above two sequences of events each represent a valid test of the circuit-interrupting device. In the user test sequence the test button is pressed, the device trips and opens the contacts. The contacts are then closed when the user resets the device. In the self-test sequence the AUTO_TEST signal turns on the test circuit relay and the device trips and opens the contacts. Then the AUTO_RESET signal resets the device and the contacts close. If the correct sequence of either test is not followed (for example the device does not trip when the test button is pressed, or the device is not reset) then the visual and audible outputs start, or continue, to indicate a test sequence failure. Upon completion of a valid user or self-test sequence, the generation of the third sequence flag causes the 30-day timer to be initiated and the visual and audible outputs to be disabled. When the 30 day timer times out, the device self-tests or enables the audible and visual outputs until a valid manual test is completed. Thus the device is tested, or reminds the user to test, the device every 30 days.

Ground Fault or Miswire

If open contacts are confirmed (0,0,1), with no preceding test button press, then a Ground Fault is assumed to have occurred. The visual and audible outputs are enabled, indicating that a valid user test sequence is required. Note that the self-test function is NOT performed so that the user is encouraged to come to the device and analyze the situation before resetting the IGFCI.

If the unit is miswired the contacts can not be closed. This is because the continuous duty relay coil is powered from the line side of the device. To close the contacts upon application of AC power the relay must pull the contacts closed. This requires power on the line side of the device, which cannot be achieved in the miswired condition unless the contacts are closed.

If the unit is miswired an input state of (0,1,0) or (1,1,0) occurs when the contacts are open. When this input state is verified, the visual and audible outputs are enabled using the microcontroller's instruction cycle as a clock. The audible and/or visual outputs can continue indefinitely until power is removed from the device. The audible and/or visual outputs may be stopped when the device is wired properly and a valid user or self-test sequence is performed.

A GFCI based on a continuous duty relay can be configured to operate in two different ways upon application of power to the device: automatic and manual reset. With an automatic reset circuit the GFCI automatically closes the power-interrupting contacts upon application of power. With a manual reset circuit the GFCI does not close the power-interrupting contacts upon application of power. The device must be reset, either by the user or the device, before the contacts will close.

Turning to the communications circuit 108, in an implementation of a one-way configuration, the IGFCI can only transmit signals. In a two-way configuration, the IGFCI can transmit and receive signals. With the one-way configuration, the IGFCIs are in communication with a central logger and can transmit their state at regular intervals or whenever their state changes. The individual IGFCIs can maintain the count for the 30-day testing cycle and perform a test and reset cycle as required. With two-way communication, the central logger can poll each IGFCI in turn and command the IGFCI to report its condition. The central logger also can send commands to annunciate, test and reset (i.e., open and close the power-interrupting contacts). A further command to open the power-interrupting contacts of the IGFCI and hold them open may be useful during fire alarms to shut off power to sections of AC lines so that secondary fires are not started. With the two-way communication implementation, the central logger also can keep the count of the 30-day testing cycle and test and reset all its IGFCIs in a systematic fashion.

With an IGFCI incorporating a manual reset circuit and two-way communication it is possible to prevent an IGFCI from being reset after power is removed and reapplied to it. For example:

1. A ground fault occurs and is not cleared.
2. There is a momentary loss and return of power to the IGFCI
3. The central logger (with a battery backup) remembers that an uncleared ground fault is present and does not transmit the signal to reset the IGFCI.

The following description details a GFCI circuit and intelligent circuit referenced to line neutral as a ground (GND). It is advantageous to have the two circuits referenced to the same GND as this saves the use of opto-couplers, which would be wasting both power and space in a package where both are at a premium. However, having GND referenced to line neutral is not a necessity. Some GFCI circuits are referenced to a floating ground through a full wave bridge in the GFCI power supply. The intelligent circuit shown can be referenced to the same floating ground if fall wave bridges are used in the power supply and input signals. The line neutral referenced implementation of the circuit may have two advantages over the GND referenced arrangement. First, if line carrier communications are used, this arrangement may make it easier to combine the communication power supply with either the GFCI or intelligent circuit power supplies. Secondly, if in the future an electronic switch can be manufactured that operates an AC current with a very low cut off current, the electronic switch can directly replace the test circuit relay in the IGFCI.

Figures 1, 2A:
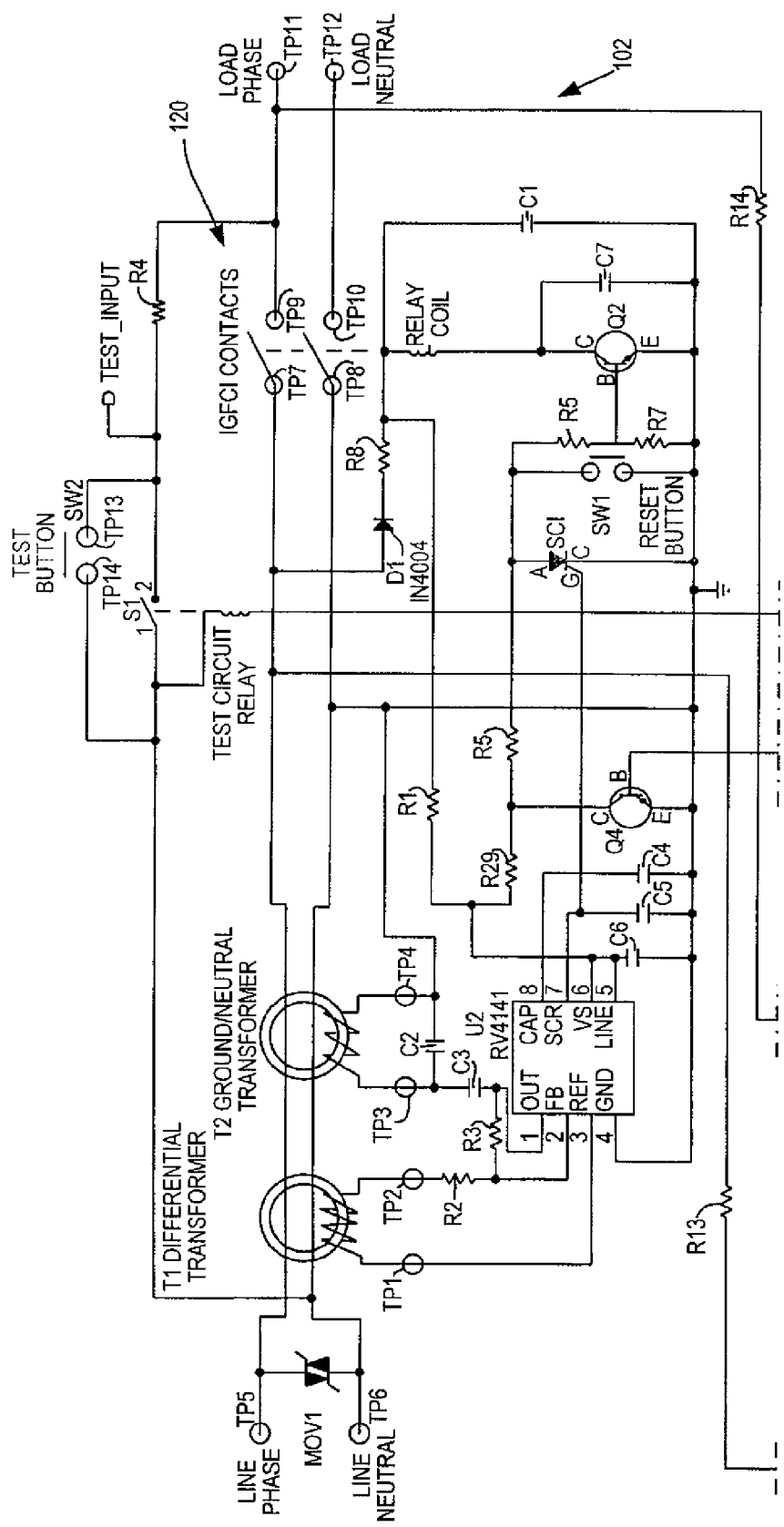
FIG. 2A illustrates a schematic of an intelligent GFCI with automatic reset functionality, according to an embodiment of the invention.
Figures 2, 2A:
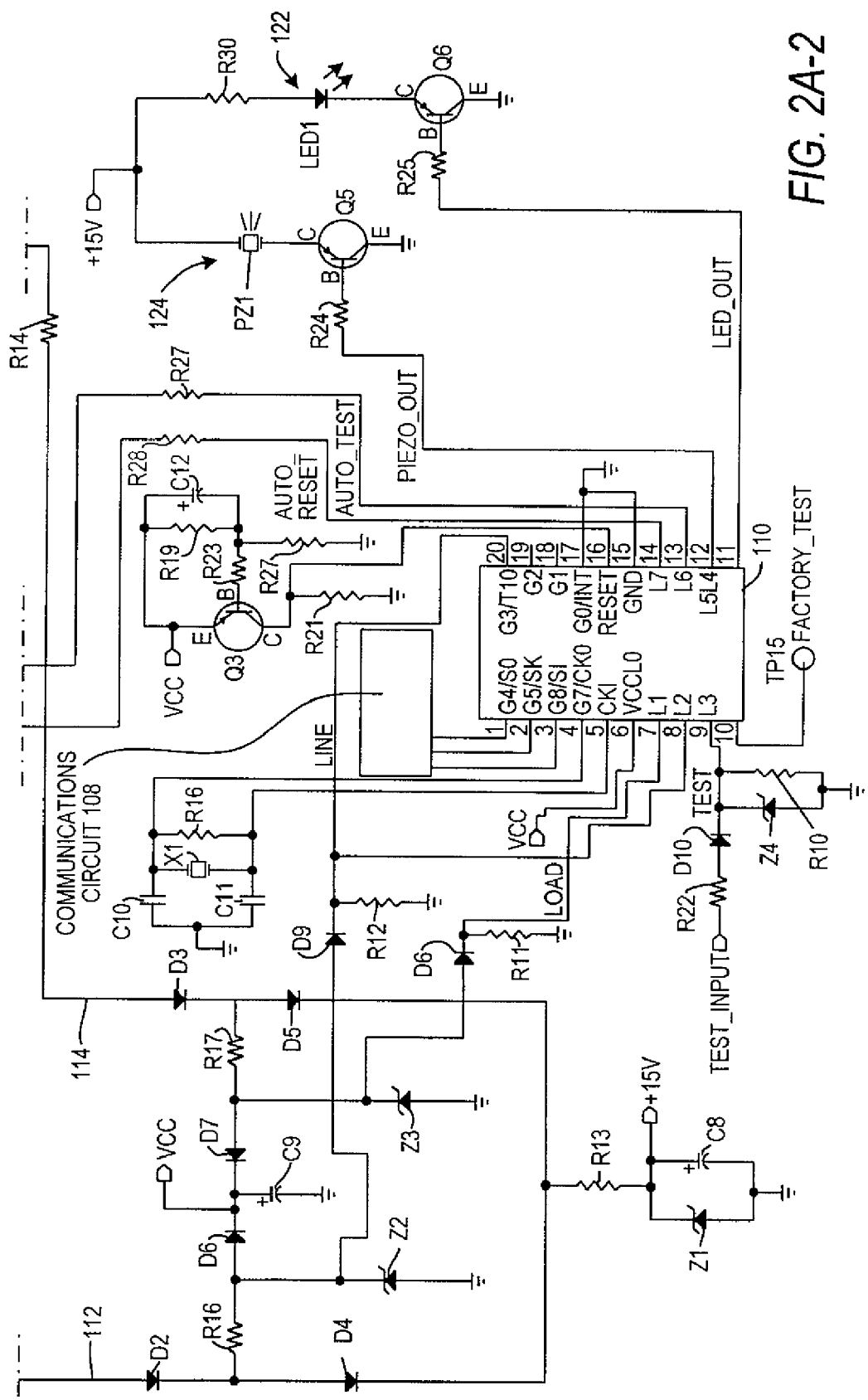

FIG. 2A illustrates a schematic of a IGFCI with automatic reset functionality. The IGFCI includes the GFCI circuit portion 102 and the intelligent circuit 104 of FIG. 1. The GFCI circuit portion 102 includes a microcircuit U2 such as Raytheon™ model RV4141A Low Power Ground Fault Interrupter. The microcircuit U2 operates with a normally closed, latched relay that is opened by a short burst of power to a solenoid. The microcircuit U2 is adapted to operate with a continuous duty relay. This relay is closed when power is applied to the relay coil 126 and open when the power is removed. The relay is coupled to power-interrupting contacts 120 to break and make a conductive path between the line and load side The microcircuit U2 can be powered from the Line Phase conductor through diode D1 and resistor R8. Capacitor C5 and a voltage reference within the microcircuit U2 can produce a 27V supply for the GFCI microcircuit U2. The diode D1 also can supply power for the relay coil 126 through R8, which can limit the current through the coil. Capacitors C1 and C7 can aid the operation of the relay coil 126 by producing a DC voltage component across the coil and suppressing transients when the coil is turned off.

When a ground fault occurs, current flows through the secondary windings of a differential transformer T1. Resistor R2 converts this current to a voltage for the inputs of the GFCI microcircuit U2. R3 is a feedback resistor for the amplifier within the microcircuit U2 and may be used to the level of ground fault at which the microcircuit produces a "high" output signal on its SCR pin (pin 7). Capacitor C4 is an external capacitor for an integrative stage within the microcircuit, which can help to filter out noise.

The microcircuit U2 also is capable of detecting grounded neutral faults. This is accomplished by the ground-neutral transformer (T2). Capacitor C2 can provide noise suppression and capacitor C3 can prevent the DC component of a signal on the T2 secondary from reaching the microcircuit U2. When a ground fault or neutral to ground fault of sufficient magnitude occurs, a "high" output signal is produced at the SCR output (Pin 7) of the microcircuit U2. This triggers the SCR (SC1) thereby pulling down the node between resistors R5 and R6 to approximately 0.5V. Capacitor C6 is a noise suppression filter to provide immunity from high frequency AC line pulses that can trigger the SCR (SC1).

During normal operation, when no ground fault is present, the base of high voltage transistor Q2 is high. This is because the transistor Q2 is driven from the 27V DC supply through the voltage divider provided by the resistors R29, R5, R6 and R7. The transistor Q2 is ON and current flows through the relay coil 126 which, in turn, closes the relay contacts 120. With the contacts close, AC power from the line side is supplied to the load side of the IGFCI.

When a ground fault is detected, the SCR output (Pin 7) of the microcircuit U2 goes "high" and the SCR SC1 is triggered (i.e., conducts current). The node between resistors R5 and R6 is pulled down to approximately 0.5V and the transistor Q2 turns OFF. The current through the relay coil 126 is removed and the relay contacts 120 open. Thus, power to the load side of the IGFCI is interrupted when a ground fault (or neutral to ground fault) is detected.

The GFCI circuit 102 also includes a reset circuit. The reset circuit includes a momentary switch SW1 which may be closed (by a user) to reset the device after the ground fault has been cleared. Closing the switch SW1 shunts current around the SCR SC1 which causes the SCR SC1 to turn OFF (i.e., stops conducting current). When the switch SW1 returns to its normally open state, the transistor Q2 is again driven ON, as described above, and the relay coil 126 is energized thereby closing the contacts 120.

The GFCI circuit 102 also includes a test circuit. The test circuit includes a momentary switch SW2 which, when closed (by the user), causes current to flow outside the differential coil between Load Phase and Line Neutral, through a resistor R4. The value of R4 is selected to produce an artificial ground fault current above the ground fault threshold of the GFCI microcircuit U2. Thus, when the switch SW2 is closed, the GFCI microcircuit U2 detects a ground fault which triggers the SCR SC1 and interrupts the circuit by opening the contacts 120. The test and reset circuit configuration allows the GFCI circuitry to be tested.

The intelligent circuit 104 is shown in the lower half of FIG. 2A. The intelligent circuit 104 can be powered from both the line and load side of the device through conductors 112 and 114. Thus, the intelligent circuit is powered regardless of whether the device is miswired or whether the interrupting contacts 120 are open or closed. Power supply circuitry can provide input signals (not shown) representing power on the LINE and LOAD signals. These signals can be used to determine whether the contacts are open and whether the Line wires have been connected to the Load terminals.

In the implementation of FIG. 2A, power is provided to the intelligent circuit 104 from the Line Phase terminal through current limiting resistor R13 and diode D2. When the voltage on the Line Phase terminal is positive in relation to the Line Neutral terminal, current flows through diode D4, thereby charging capacitor C8 through resistor R15. Zener diode Z1 limits the voltage across capacitor C8 to 15V. Simultaneously, current flows through resistor R16 and diode D6 thereby charging capacitor C9.

Power also is provided to the intelligent circuit 104 from the Load Phase terminal through current limiting resistor R14 and diode D3. When the voltage on the Load Phase terminal is positive in relation to the Line Neutral terminal, current flows through diode D5, thereby charging capacitor C8 through resistor R15. As described above, the voltage across capacitor C8 is limited to 15V by Zener diode Z1. Simultaneously, current flows through resistor R17 and diode D7 thereby charging capacitor C9. The voltage across capacitor C9 is limited to 5V by the two Zener diodes Z2 and Z3.

If a floating ground is used, then full wave rectification can be used in the power supply of the intelligent circuit 104.

Capacitor C9 can provide the voltage supply for the microcontroller 110. The value of capacitor C9 is sufficient to sustain 5VDC with the current from the Load or Line side of the device only. Capacitor C8 provides the voltage supply for the local annunciators including the visual indicator 122 (e.g., LED) and the audible indicator 1243 audible indicator 124 (e.g., piezoelectric buzzer). The value of the capacitor C8 is sufficient to sustain 15VDC with the current from the Load side or Line side only.

The voltage across the Zener diode Z2 may be used to provide to the microcontroller U2 an input signal representing the presence of a voltage on the Line side of the device. An input pin of the microcontroller U2 is driven from the voltage across the Zener diode Z2 through diode D8. Resistor R12 ensures that the LINE input pin is held at ground when not being driven by the Line signal. The half wave LINE signal produced by this arrangement also drives the external input of the timer of the microcontroller 110. Thus, the LINE signal is also used for timing and for indicating to the microcontroller 110 when to poll the inputs.

The microcontroller 110 does not use the TEST signal from the Test Button (SW2) to aid the timing and polling functions of the microcontroller 110 because the circuit is referenced to Line Neutral. The TEST signal is half wave rectified when the Test Button (SW2) is not actuated, but it is pulled to zero when the button is actuated. The closing of the Test Button (SW2) connects the Test Input node to the Line Neutral terminal.

When the Test Button (SW2) is not actuated, the 60 Hz AC voltage appearing at the node Test Input is converted to a 5V square wave by the components R2, D10 and Z4. Resistor R10 ensures that the TEST input pin of the microcontroller 110 is pulled low when the Test Button is being pressed. In a similar fashion to the LINE signal, the voltage across Zener diode Z3 is used to provide a 5V square wave representing the AC voltage on the Load side of the device. The voltage across Zener diode Z3 is used to drive an input of the microcontroller 110 through diode D8. Resistor R11 ensures that the LOAD input pin is held at ground when not being driven by the LOAD signal.

The microcontroller 110 is powered from the 5VDC provided by the power supply, as described above. A power-on-reset circuit includes transistor Q3, resistors R20, R21, R23, R19 and capacitor C12. When power is first applied, the power-on-reset circuit ensures that the RESET pin of the microcontroller 110 is held low until the power supply charges to close to 5V. Also, when there is a momentary loss of power to the circuit, the power-on-reset circuit pulls the RESET pin low if the voltage supplied to the microcontroller 110 falls too low, thus resetting the microcontroller. Thus, low voltage on the power supply may not erase the microcontroller's volatile memory, without the microcontroller being RESET.

The clock circuit used to drive the microcontroller 110 determines the speed of the microcontroller's instruction cycle. This clock circuit includes crystal X1, resistor R18 and capacitors C10 and C11. The oscillating frequency of the crystal must be relatively low, in the order of hundreds of kilohertz, for the microcontroller circuit to operate with less than 0.5 mA.

Three inputs LINE, LOAD and TEST are connected to three input/output pins of the microcontroller 110. The LINE input also may be connected to a timer/interrupt input pin so that the microcontroller 110 can detect a positive edge (slope) on the LINE signal. The microcontroller 110 can consistently poll at the inputs during the positive half cycle of the AC, preventing misdiagnosis of inputs by testing them at other times in the AC cycle. Alternatively, the microcontroller can use the negative edge of the TEST input, due to it being half wave rectified with the Test Button not actuated and full wave rectified when the Test Button is actuated.

A fourth input, called FACTORY_TEST, may be available to the microcontroller 110. If the FACTORY_TEST pin is held to VDD after a power-on reset, the microcontroller 110 can run a subroutine that tests all the functions of the microcontroller software. In this manner the intelligent circuit 104 can be tested in the factory after all the components have been soldered to a printed circuit board. The typical user of the IGFCI may not have access to the FACTORY_TEST input, as it will be enclosed in the device. This is useful for quality assurance purposes during production.

The microcontroller 110 can generate four outputs: LED_OUT, PIEZO_OUT, AUTO_TEST and AUTO_RESET. This is not including the outputs required to drive the communications circuit. The LED_OUT signal can drive a base of a transistor Q6 through resistor R25. The transistor Q6 can control the local visual indicator 122 such as LED LED1.

A resistor R30 can limit the current though the LED LED1. The PIEZO_OUT signal can drive a base of a transistor Q5 through a resistor R24. When the PIEZO_OUT signal is low then the transistor Q5 is off. When the PIEZO_OUT signal is high then the transistor Q5 drives an audible indicator 124 such as piezoelectric buzzer. In an implementation, the buzzer operates at approximately 3-4 KHz. The piezoelectric buzzer and the LED can be driven from the 15V DC power supply so that they do not pull down the voltage supply from the microcontroller.

When visual and audible outputs are required from the IGFCI, the LED and piezoelectric buzzers can be driven, for example, as follows:
1. Both outputs OFF for 1.4 seconds
2. LED ON for 0.1 seconds
3. Both outputs OFF for 1.4 seconds
4. Piezoelectric buzzer ON for 0.1 seconds
5. Go back to step 1

Driving the visual and audible outputs in this manner can enable capacitor C1, holding up the 15V DC power supply, to charge up again between the alternating outputs. This can enable the circuit to operate on current of less than 0.5 mA.

In an alternative implementation, the output signal from the microcontroller 110 can be a steady 5V when ON, and 0V (GND) when OFF rather than having software generate a 3-4 KHz output when ON and GND when OFF. The microcontroller 110 output can be used to drive an oscillator circuit or piezoelectric crystal with an internal oscillator.

The AUTO_TEST output can be used to self-test the GFCI portion 102 of the circuit. A positive signal on this output can activate the test circuit relay coil through resistor R27. This is equivalent to actuating the Test Button (SW2). A current flows outside the differential coil between the Load Phase terminal and the Line Neutral terminal through resistor R4. The value of the resistor R4 is selected to provide an artificial ground fault current above the ground fault threshold of the GFCI microcircuit U2. Thus, when the test circuit relay contact is closed: the GFCI detects a ground fault, triggers SC1 and interrupts the circuit. In this way the circuit is tested. The positive AUTO_TEST output is continued until a trip of the circuit is detected.

In an alternative implementation of a self-test, any electrically controlled switch, in parallel to the TEST switch, can be used to shunt a sufficient AC current to generate a ground fault. If the test circuit relay cannot be driven directly from a pin of the microcontroller 110 then a microcontroller pin can be used to drive a transistor which, in turn, drives the coil of the test circuit relay. The relay and its contacts do not have to be very large as the relay is only closing and opening on currents in the order of tens of milliamps.

Resistor R27 can limit the current flowing through the test circuit relay coil. Note that the current limiting resistor R4 is on the Load Phase side of the Test Button (SW2). This requires the node generating the TEST signal to be on the Load Phase side of the Test Button.

If the test circuit relay fails in a short circuit fashion then the IGFCI will trip. This is a safe situation. If the test circuit relay fails in an open circuit fashion then the Test Button can still be used to trip the device even though the self-testing function does not operate.

The AUTO_RESET output can be used to reset the device after it has been tripped by the AUTO_TEST signal. When the microcontroller 110 generates a positive output on the AUTO_RESET line, transistor Q4 is driven ON. Resistor R28 can limit the current and voltage to the gate of transistor Q4 and resistor R9 pulls the base of the transistor Q4 to ground when the AUTO_RESET output is not present. When the transistor Q4 is ON, the node between resistor R29 and resistor R5 is pulled to a low voltage. This starves the SCR (SC1) of current causing it to turn OFF. When the AUTO_RESET signal is removed, and transistor Q4 turns OFF, transistor Q2 returns to an ON state which activates the relay coil 126, closing the contacts and resetting the device. Note that if the transistor Q4 fails in a short circuit fashion, then the transistor Q2 will turn off, thus causing power to the load to be interrupted. This is a safe situation. If the transistor Q4 fails in an open circuit condition, then the GFCI circuit can still trip due to a ground fault (SC1 can still be fired) so this is a safe situation, too.

Note that if the AUTO_RESET output is held HIGH, then the relay contacts of the IGFCI open and are held open indefinitely.

An advantage of the continuous duty relay powered from the line side of the device is that if a miswiring occurs then the device can not be reset by the intelligent circuit or by un-triggering SC1. The relay contacts may be closed manually before the relay can be activated to hold them closed.

Figures 1, 2B:
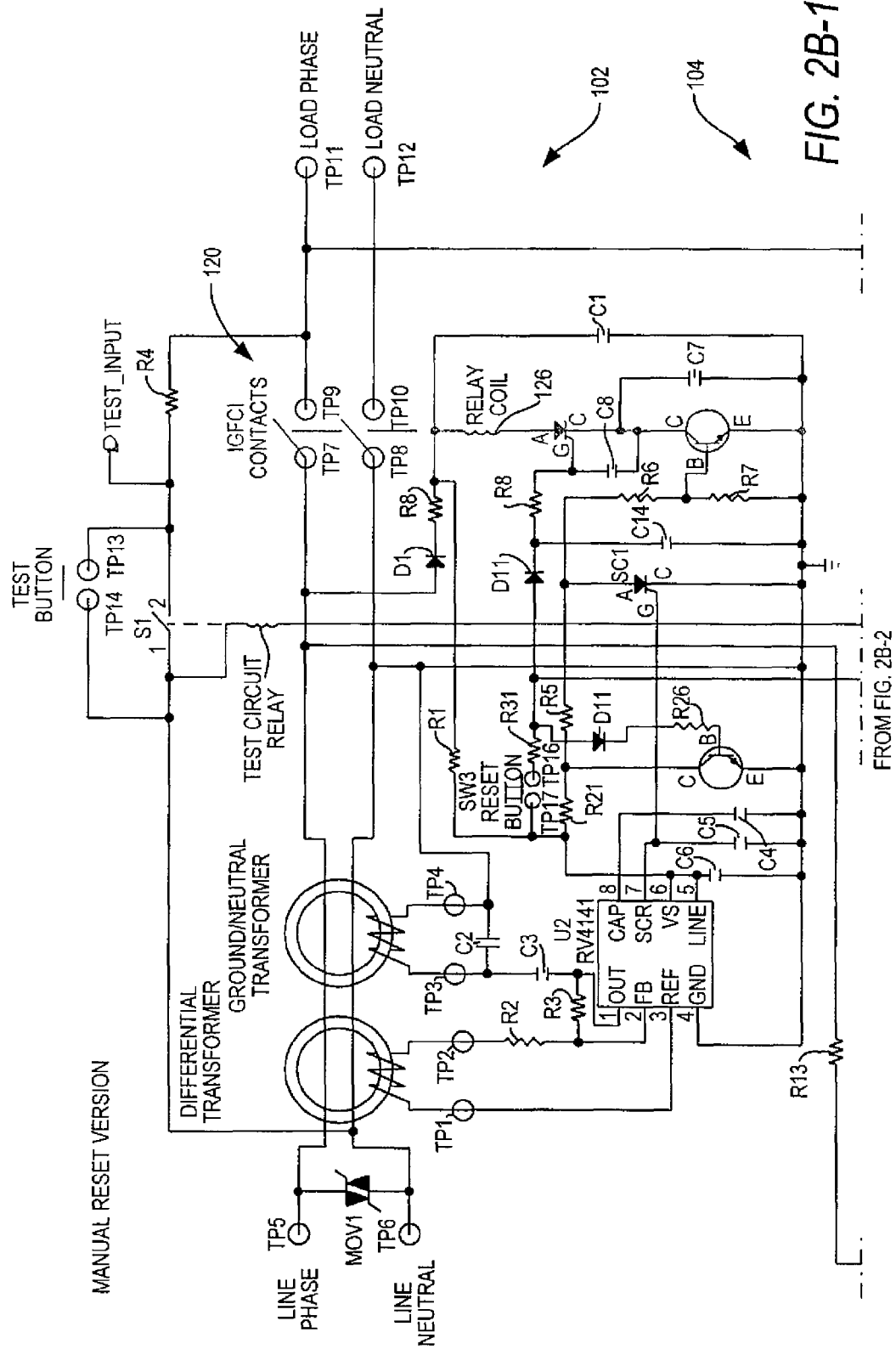
FIG. 2B illustrates a schematic of an intelligent GFCI with manual reset functionality, according to an embodiment of the invention.
Figures 2, 2B:
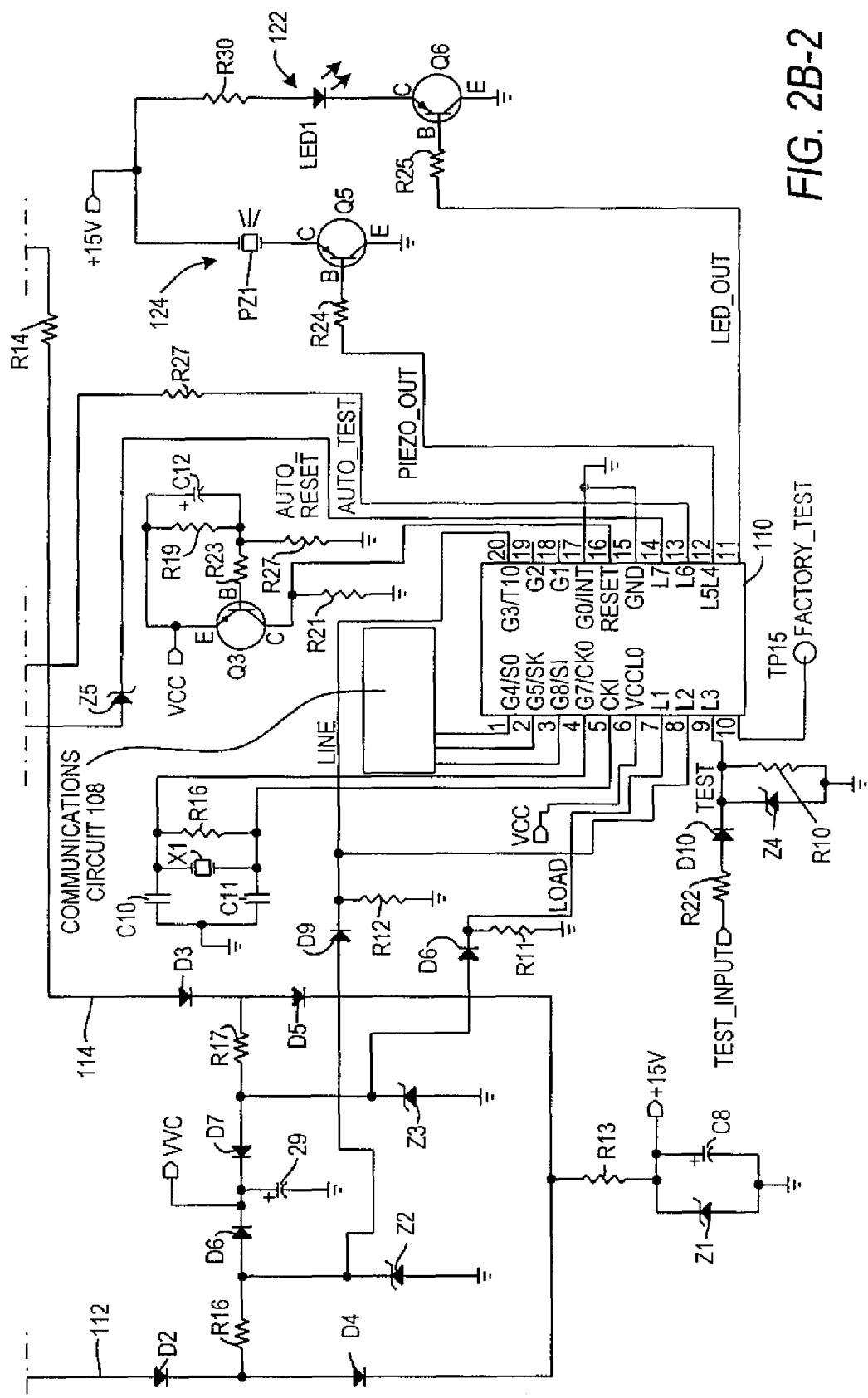

FIG. 2B illustrates a schematic of a circuit for a manual reset GFCI. As explained above, two types of continuous duty relay GFCIs may be provided: automatic reset and manual reset. The automatic reset type, described above, closes the GFCI contacts 120 automatically upon application of power. In the manual reset type, the contacts 120 do not close automatically upon application of AC power. Rather, the circuit has to be manually reset by the user (or reset by the intelligent circuit).

An SCR (SC2) is placed in series with the high voltage transistor Q2. The circuit is similar to the automatic reset type, described above. The additional circuitry and operation will be described herein. When power is applied to the circuit, transistor Q2 turns ON, but SCR SC2 is OFF. To close the contacts 120 (or reset the device after it has tripped) a momentary reset button SW3 may be closed. When the reset button SW3 is closed, current is supplied to two paths. First, current flows through resistor R31, diode D12 and resistor R26 to turn ON the transistor Q4, which un-triggers SCR SC1. Second, current also flows through resistor R31, diode D11 and resistor R9 to trigger SCR SC2. The GFCI 102 closes the contacts 120 when the reset button SW3 is opened and the transistor Q2 is driven ON again. Capacitor C14 and C13 ensure that SCR SC2 stays on long enough after the reset switch opens for the current to start flowing through Q2, thus latching SCR SC2 ON.

The AUTO_RESET output is now connected to the node between resistor R31 and diodes D12 and D11 through Zener diode Z5. Zener diode Z5 can have a Zener voltage of approximately 2.5V and ensures that the GFCI does not reset while the intelligent circuit is powering up. Turning on the AUTO_RESET output has a similar effect as closing the reset button SW3. If the AUTO_RESET output is held high then the GFCI contacts 120 will open and be held open.

Software and Communications

The self-testing function and communication capability to a central logger do not have to be applied in combination. That is, the IGFCI can have one or both functions. Thus, an implementation includes a self-testing stand-alone device, where the decision to self-test is made by the microcontroller in the device. Another implementation can have a device that communicates to a central logger but does not have self-test capability. In this second case the condition (or state) of the GFCI is transmitted to a remote (central) location, but the user still has to manually test the GFCI. Also, the communication may be one-way or two-way. That is, the IGFCI may be able to transmit only or both transmit and receive, respectively. The IGFCI can have both the self-test and communications functions.

The IGFCI of the present disclosure can be arranged in different combinations of self-test function/no self-test function and one way/two way communication. To simplify the descriptions, a communication capability will be assumed. Possible combinations are:

No self-test function with one way communication
No self-test function with two way communication
Self-test function with one way communication
Self-test function with two way communication Flow diagrams for the "no self-test—one way communication" and "self-test—two way communication" embodiments are included. The first set of flow diagrams (FIGS. 3-6) show the requirements for remote signaling capability and the second set (FIGS. 7-12) shows the adjustments and additions required to provide the self-testing and two-way communication features.

The transceiver/human interface at the central logger can provide various configurations or displaying IGFCI status information. The size and power consumption of the central logger may not be as limited as for the IGFCI mounted in a one-gang outlet box. The central logger may have battery backup or non-volatile memory so that it can store and recall the addresses and states of the various IGFCIs even if AC power is lost at the central logger. Also, the software processes required at the central logger, or those needed to handle the communications may be implemented in any desired fashion. These processes can depend upon the communication protocols and the amount of information required to be displayed at the central logger.

Table II illustrates states of IGFCI flags set by the microcontroller and the signals transmitted to the central logger.

TABLE II

| State of Inputs, Flags and Registers | Remote Signal |
| --- | --- |
| Confirmed Closed Contacts; No Flags (or timer service flag only) | Normal Operation (contacts closed) |
| Old Input = 0, 0, 0 | Power on Reset |
| Confirmed Open Contacts; Test Press Flag = 0 | Ground (or other type) Fault |
| Test Press Flag = 1 | Pressed Test Button |
| Seq_Open Flag = 1 | Open After (User or Self) Test Sequence |
| Seq_Reset Flag = 1 | Successful (User or Self) Test Sequence |
| 30 Day Counter Decremented to Zero | 30 Days are Over |
| Confirmed Reverse Wiring | Reverse Wiring |

In the case of a multifunction circuit interrupter, such as a GFCI-AFCI combination, the inputs to the microcontroller (and its software) can be altered to provide information on what sort of fault tripped the device. Different signals can be sent to the central logger including ground fault, arc fault and/or over-current fault.

The signal indicating that "30 days are over" can be used to distinguish from annunciation at power on reset.

If all the signals except the "Annunciate" signals are used, then the central logger will still know when to annunciate, but also can have information about what state of the IGFCI. The "Start Annunciate" and "Stop Annunciate" signals are redundant if all the other signals are used. The central logger will know if a user test sequence has failed, because it will not receive a "Successful Test Sequence" signal within a certain time period after an "Open After Test" signal The transmitted state of "Normal Operation" may be included if useful for the IGFCI to confirm a normal operating status at regular intervals during the 30 day period between required tests. If this is not done, then the IGFCI will be silent for a period of 30 days until it sends the "30 days are over" signal. The regular "Normal Operation" signal can be useful for checking if a particular IGFCI is still transmitting. If the central logger does not receive a "Normal Operation" signal within an allotted time the central logger can warn the user that there may be something wrong with the IGFCI or the connection between the central logger and the IGFCI.

An alternative to transmitting the "Normal Operation" signal would be for the IGFCI to send the number of days left in the 30-day cycle. This can be achieved in two ways.

Transmissions are triggered when the 30-day timer counts past numbers defined as "29 days remaining," "28 days remaining," "27 . . . " etc.

A 1-day counter also can be used. When this day counter becomes zeroes, a second "thirty-count" register is decremented. If the "thirty-count" register is not zero then its new value is transmitted as the days remaining in the 30-day cycle and the 1-day counter is reset. If the "thirty-count" register is zero, then the "30 Days Are Over" signal is transmitted and the IGFCI begins to annunciate.

Flow diagrams (FIGS. 3 to 6B) illustrate where the output to the communications circuit interfaces with the IGFCI implementation. These flow diagrams show the more "information rich" set of transmission codes rather than the "annunciate start/stop" transmissions.

During each transmission to the central logger, a IGFCI sends its state and a unique code representing the particular IGFCIs address. Dip-switches on the IGFCI can set this address, or a unique address can be encoded in the IGFCIs software.

When power is first turned, the IGFCIs send their address (and the code for annunciate) to the central logger. In this way the central logger determines the number of IGFCIs it is displaying status and reserves the correct amount of addresses, lines on a display, or number of LEDs for the IGFCIs. As each annunciating IGFCI is tested and reset for the first time, the installer can assign each IGFCI to a particular central indicator and label it (bathroom 5 outlet 3 for example). To replace an IGFCI, the installer can provide the new IGFCI the same address as the old one. When an extra IGFCI is added to the network, with a previously unused address, the central logger recognizes the new IGFCI and allows it to be configured. The installer has to ensure that two IGFCIs do not have the same address.

No Self-Test—One Way Communication

In this embodiment, the IGFCI only transmits its status to the central logger, it cannot take commands from the central logger. Also, the IGFCI relies upon the user to manually test and reset the GFCI circuit. If a single network is used to connect several IGFCIs to a central logger, the communications protocol may need to have a protocol for multiple signals arriving at the same time. This is because there may be times that several IGFCIs are transmitting all at once.

The software for this embodiment of the remote signaling IGFCI includes the transmission of the IGFCIs state whenever the IGFCI changes to a new state, as shown in Table I.

TABLE I

| State of Inputs, Flags and Registers | Remote Signal |
| --- | --- |
| Annunciate Flag 1→ 0 | Stop Annunciate |
| Annunciate Flag 0→ 1 | Start Annunciate |

Table I illustrates a simple form of remote signaling IGFCI possible. The IGFCI sends a signal to "Start Annunciate" and "Stop Annunciate." The central logger would then annunciate at the same time as the IGFCI, and stop annunciating when the annunciation at the IGFCI is turned OFF by a successful test sequence.

Figure 3:
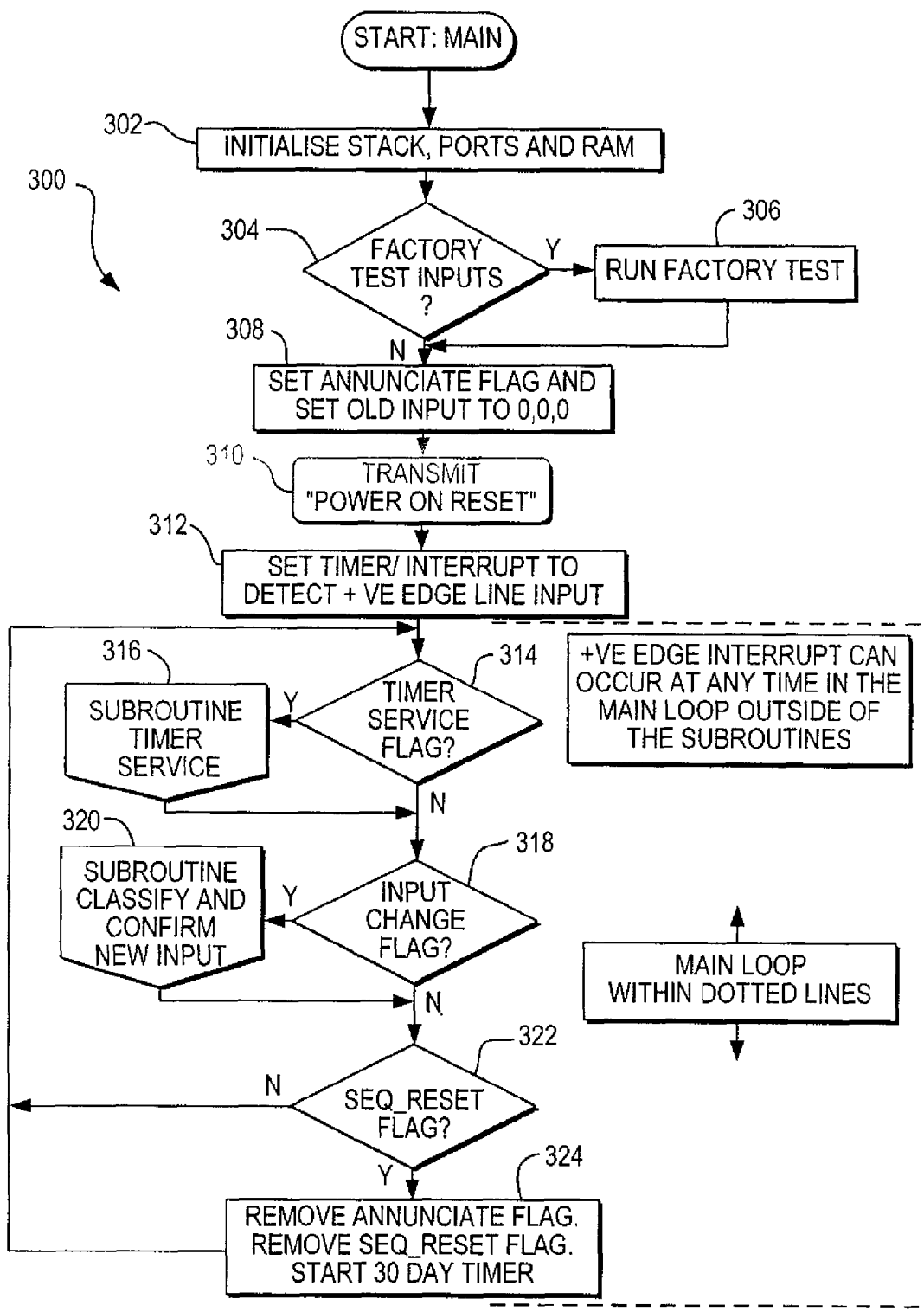
FIGS. 3-6 are flow diagrams of an implementation of an intelligent GFCI having one-way communication with no self-test functionality.

FIG. 3 is a flow chart 300 of a main program for a remote signaling IGFCI without self-test. The IGFCI is initialized (step 302) to reset the hardware and software to a known starting position. If a factory test input is applied (step 304), the factory test, described above, is run (step 306). Alternatively, the annunciate flag is set (step 308) and an "old input" is set to (0,0,0) wherein the 3 bit binary number represents (TEST, LINE, LOAD). The IGFCI transmits (step 310) a "power on reset" signal and initiates the power on reset of the IGFCI. After completion of the power on reset the IGFCI microcontroller is set (step 312) to detect a positive going edge on its timer/interrupt pin. When a positive edge is detected on this pin, an interrupt occurs as detailed in FIG. 4, below. From this point, the software enters a loop. The timer service flag is monitored (step 314). When the timer service flag is set the timer service routine is executed (step 316), described below. Alternatively, the software monitors if the input flag has changed (step 318) from the previous (or old) input. If so, the software branches (step 320) to a subroutine, described below, to confirm that a new input has been received and to classify the new input as to the new status of the IGFCI. The software then checks for a sequence_reset flag (step 322). If the flag indicates a (user or timer) self-test has not been run, the software loops back to monitoring the timer service flag (step 314). Alternatively, the annunciate flag and sequence_reset flag are removed and the periodic (30 day) timer is re-started (step 324) before looping back to monitoring the timer service flag (step 314).

Figure 4:
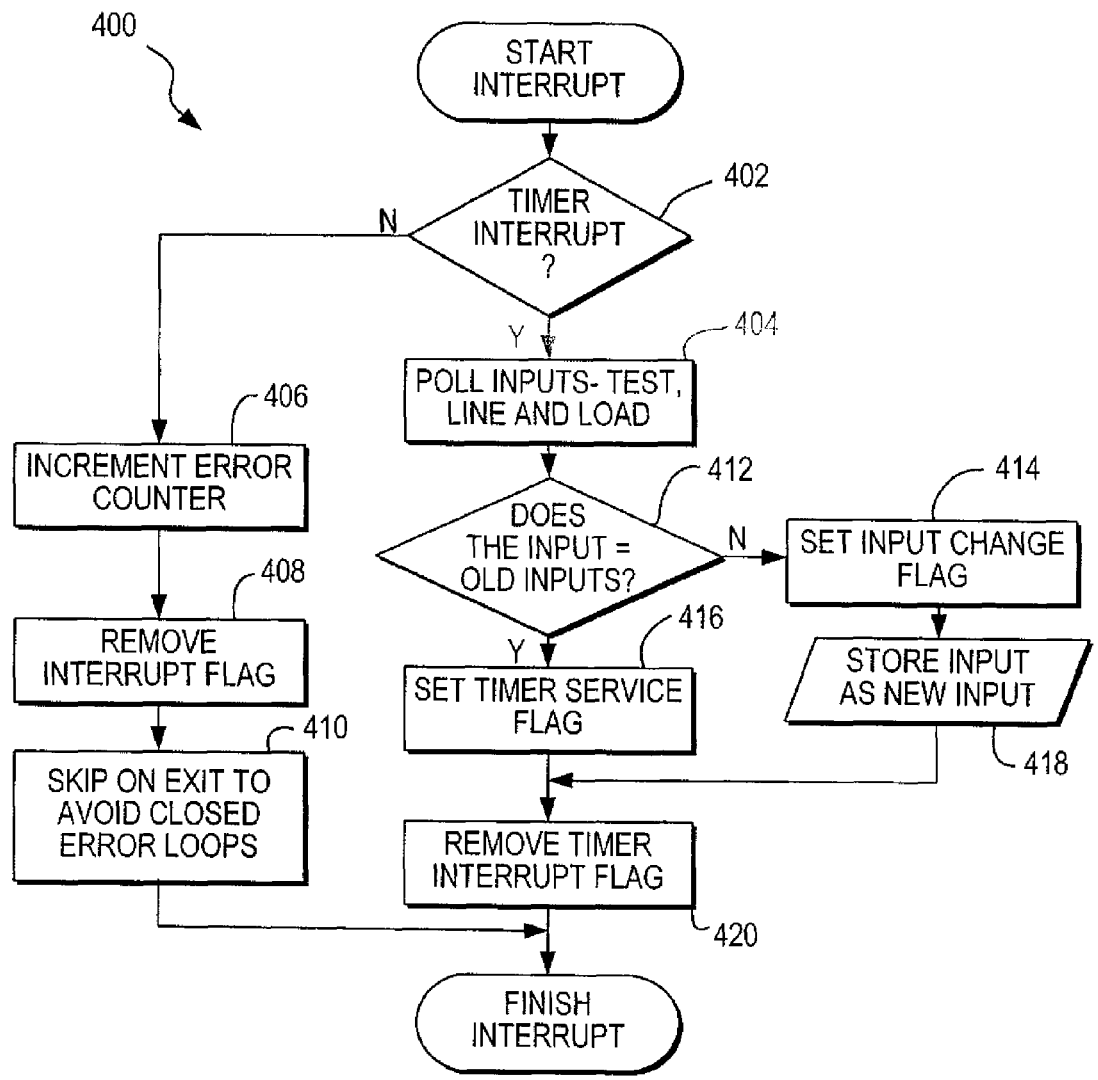

FIG. 4 is a flow diagram 400 illustrating an implementation of the interrupt service routine of the IGFCI device. When an interrupt occurs, it is checked (step 402) whether the interrupt was triggered by a timer interrupt. If not, an error has occurred and an error counter is incremented (step 406) and the interrupt flag is removed (step 408). The program proceeds to skip on exit (step 410) to avoid accumulating closed loop errors. Alternatively, if the interrupt is not from the timer at (step 402), the input signals are polled (step 404) by reading the current 3-bit input signals, TEST, LINE and LOAD, through the microcontroller I/O port. If the current 3 bit input is the same when compared (step 412) to the 3 bit input recorded as OLD_INPUT, the timer service flag is set (step 416). If they are not the same, the INPUT_CHANGE flag is set (step 414) and the current 3-bit input is stored as a variable called NEW_INPUT (step 418). The timer interrupt flag is then removed (step 420).

Figure 5:
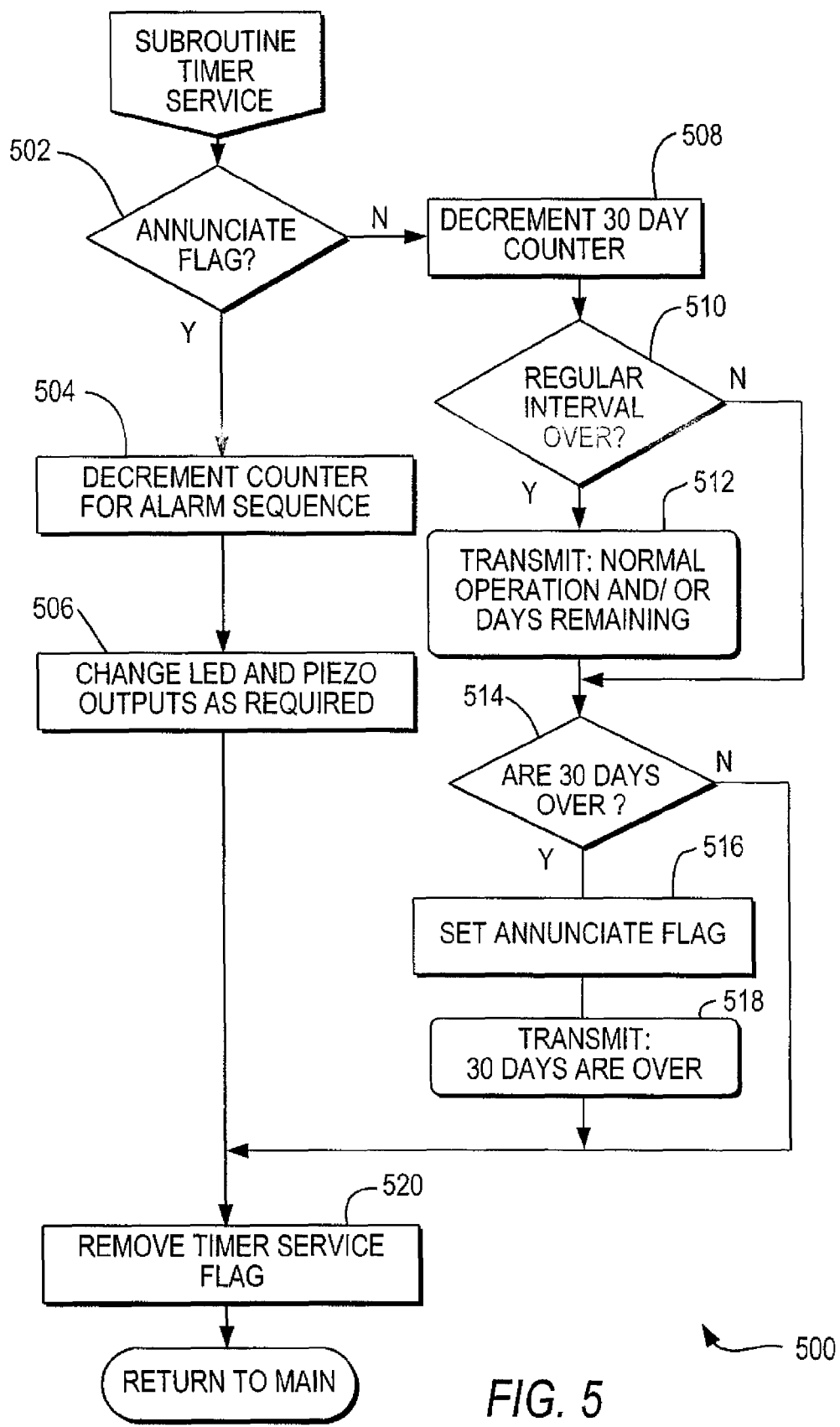

FIG. 5 is a flow chart 500 of an implementation of a timer service subroutine of the IGFCI main routine of FIG. 3. This routine may be entered when the timer service flag is set (See FIG. 3 step 314). The ANNUNCIATE flag is checked (step 502). If the ANNUNCIATE flag is set, the alarm sequence counter is decremented (step 504) and the LED and buzzer output signals are changed as needed (step 506), that is, to create the required audible and visual indicators. If the flag is not set, the 30-day counter is decremented (step 508). If a regular interval has elapsed (step 510) a signal is transmitted (step 512) to the central logger indicating normal operation and/or days remaining. If a regular interval has not elapsed (step 510), then the 30-day timer is checked (step 514). If 30 days have elapsed, the ANNUNCIATE flag is set (step 516) and the IGFCI transmits to the central logger that 30 days have elapsed (step 518). Before exiting, the timer service flag is reset (step 520).

Figure 6A:
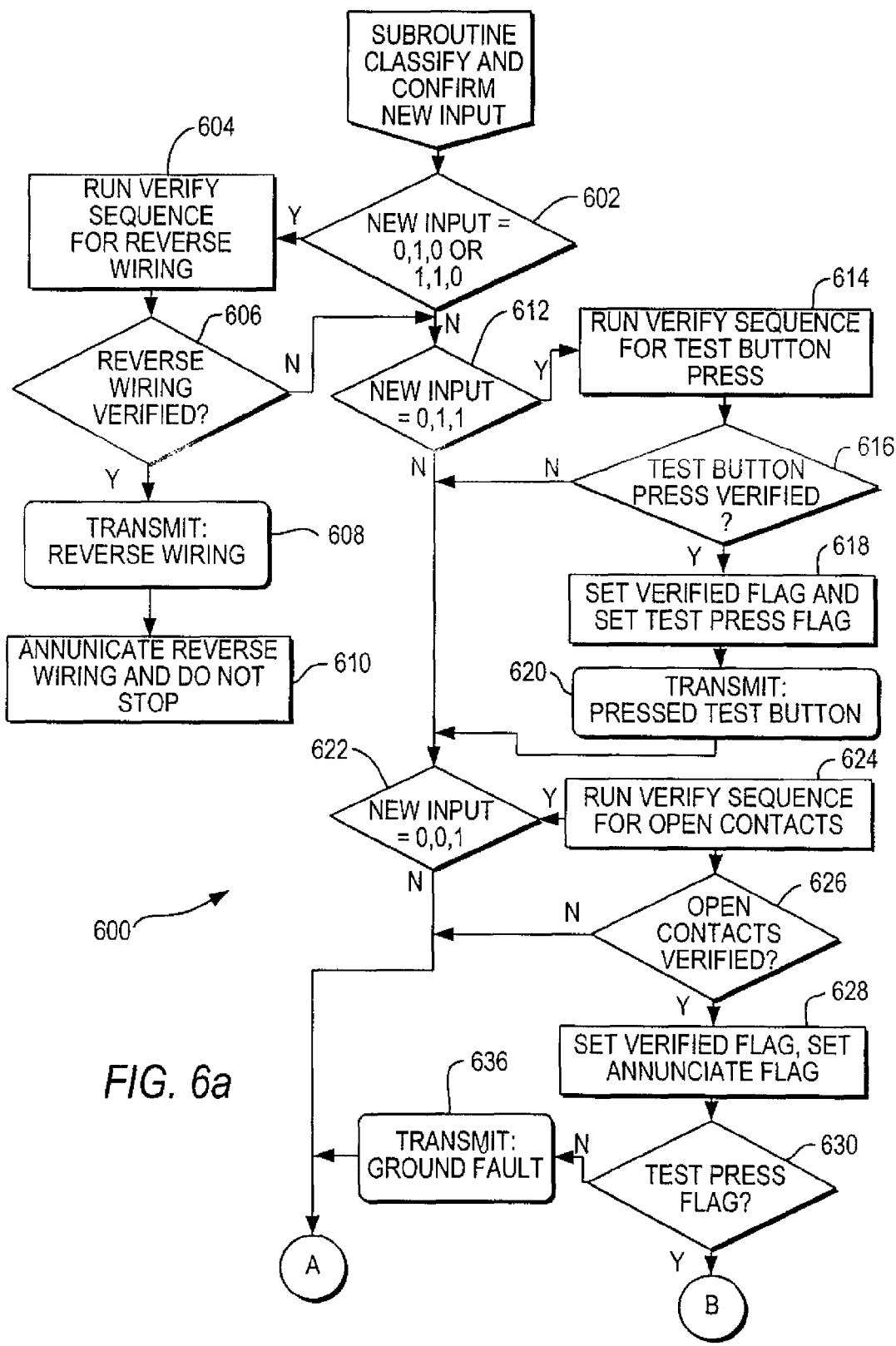
Figure 6B:
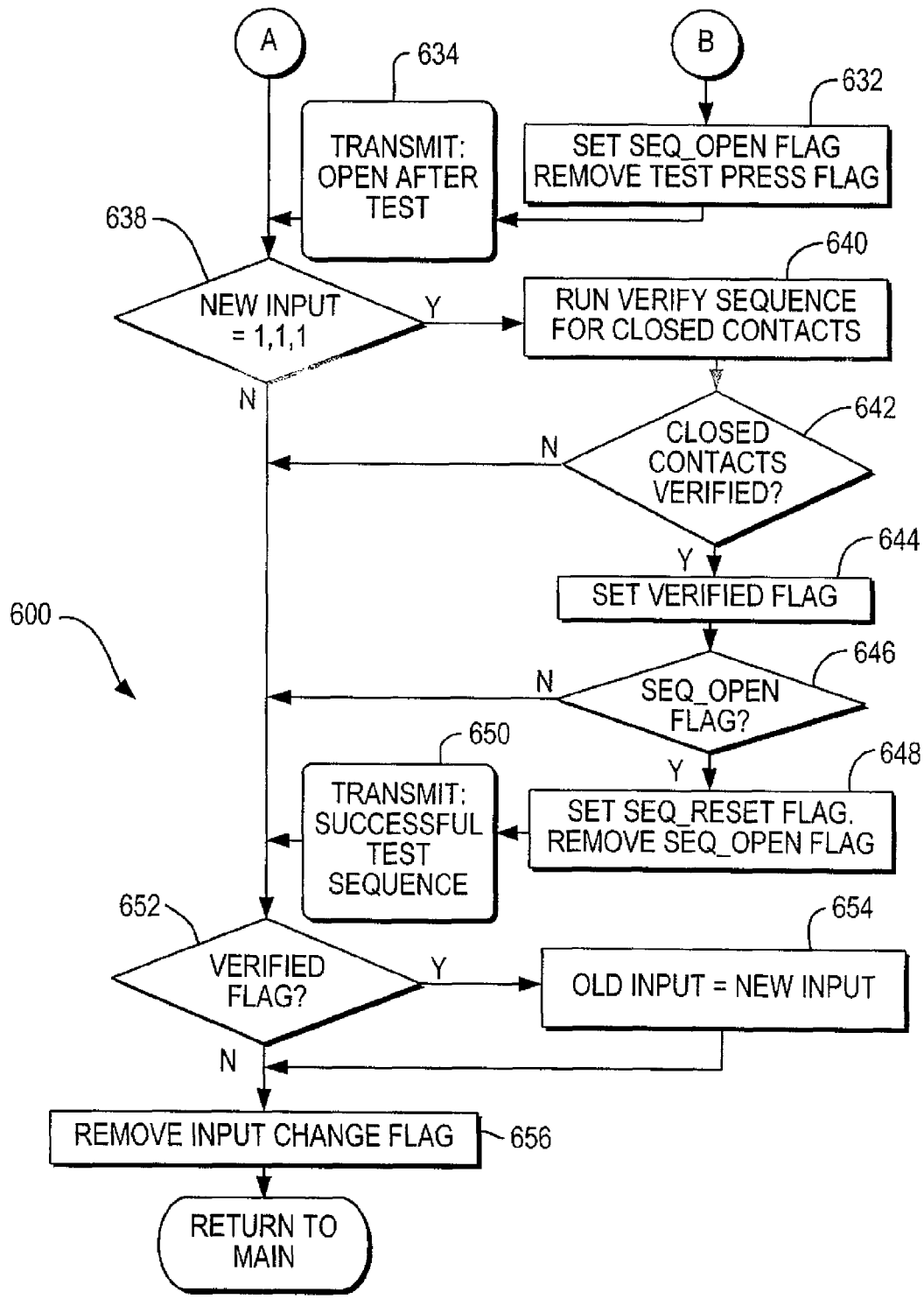

FIGS. 6A and 6B illustrate flow diagrams 600 for an implementation of a routine for classifying and confirming new inputs. The variable NEW_INPUT is checked (step 602) for the value (0, 1, 0) or (1, 1, 0), that is, a line/load reversal condition. If so, the device verifies (step 604) whether a miswiring condition actually exists by, for example, sampling the inputs multiple times. If a miswiring condition is verified (step 606), then a signal indicating a miswiring is transmitted (step 608) to the central logger and the visual and audible indicators are annunciated (step 610) continuously and cannot be stopped other than by removing electrical power from the device. If a miswiring condition is not verified (step 606), the device checks (step 612) if the variable NEW_INPUT equals (0, 1, 1). If so, the device verifies (step 614) if the test button was pressed. If a test button press is verified (step 616), the VERIFIED and TEST PRESS flags are set (step 618) and the IGFCI transmits (step 620) a pressed test button signal to the central logger. If the test button press is not verified (step 616), the NEW_INPUT variable is checked (step 622) if it equals (0, 0, 1), that is, open power interrupting contacts. If so, the device verifies (step 624) whether the contacts are open. If the open contacts are verified (step 626), the VERIFIED and ANNUNCIATE flags are set (step 628) and a contacts open after test signal is transmitted (step 634) to the central logger. It is then checked whether the test press flag is set (step 630). If so, the SEQ_OPEN flag is set and the test press flag is removed (reset) (step 632). If the test press flag set is not verified (step 630), a ground fault signal is transmitted (step 636) to the central logger.

The variable NEW_INPUT is checked (step 638) for a value of (1, 1, 1), that is, closed power interrupting contacts. If so, the device verifies (step 640) whether the contacts are closed. If the closed contacts are verified (step 642), the VERIFIED flag is set (step 644). It is then checked whether the SEQ_OPEN flag is set (step 646). If so, the SEQ_RESET flag is set and the SEQ_OPEN flag is removed (reset) (step 648). The device transmits (step 650) a successful test sequence signal to the central logger. The Before the routine returns, the VERIFIED flag is checked (step 652) as set. If so, the variable OLD_INPUT is set to the same value as the variable NEW_INPUT (step 654). The input change flag is reset (step 656) and the subroutine returns to the calling program.

No Self-Test—Two Way Communication

This embodiment is similar to the "no self-test—one way communication" embodiment. The inclusion of two-way communication means that the central logger can poll the IGFCIs with which it is in contact. This reduces the collisions of data being transmitted from the various IGFCIs. If many IGFCIs are linked to one central logger then data collisions can slow down the transfer of data from the IGFCIs to the central logger. Through the use of two-way communication, the central logger can take over the management of the signals from the IGFCIs and can also send out a limited number of commands. The commands that the central logger can send include:

IGFCI address+Transmit Current State
IGFCI address+Transmit Time Remaining in 30 day cycle
IGFCI address+Annunciation On
IGFCI address+Annunciation Off The transmissions available from the IGFCI may be the same as those for the "no self-test—one way communication" embodiment. But transmissions of the state of the IGFCI can be triggered by the IGFCI microcontroller's recognition of a transmitted command from the central logger.

Setup may be accomplished when the central logger is first powered up. For example, assume that the maximum number of IGFCIs for each central logger "unit" is 16. Further, assume that there are 16 "group codes" to distinguish the group of IGFCIs belonging to one unit from IGFCIs in another unit. On powering up, the central unit will poll each of the 16 numbers in its group, recording how many IGFCIs are present. Each IGFCI can be labeled and assigned a particular central indicator as each annunciating IGFCI is tested and reset for the first time. Alternatively, each IGFCI can be assigned and labeled as part of a special "assign" function. This function will tell a particular IGFCI to turn its Annunciation ON (and make sure all others are OFF) so that it is easy to locate. The user will assign and label the particular IGFCI and the central unit will turn the annunciation OFF when the user is finished.

Once set up, the central unit can poll the members of its group one at a time at regular intervals. Two-way communication also makes it possible to have the central logger count the 30-day cycle. This may be more advantageous than having all the IGFCIs timeout at different times. If all the IGFCIs timeout at once, it is a simpler operation to test and reset them at the same time. Furthermore, if the 30 day annunciation is controlled by the central logger (with a 24 hour battery backed up clock) then annunciation can be switched off during the night or only turned on at certain times (for example, when cleaning staff are passing through a building). If a unit is already annunciating due to a ground fault or reverse wiring, the central unit is used to count the 30-day cycle then the "30 days are over" and "X days remaining" transmissions from the IGFCI may not be necessary.

Self-Test—One Way Communication

In this arrangement the IGFCI keeps the count of 30 days and determines when the device should self-test and reset. As in the "No Self-Test—One Way Communication" embodiment, the IGFCI can only transmit its status to the central logger, it cannot take commands from the central logger. However, the IGFCI does not rely upon the user to test and reset the GFCI circuit. The IGFCI software and hardware determine when the self-test is run. If a single network is used to connect several IGFCIs to a central logger, there must be some form of collision avoidance in the communications protocols. This is because there may be times that several IGFCIs are trying to transmit all at once.

The states that the IGFCI can transmit to the central logger have increased by one:

TABLE III

| State of Inputs, Flags and Registers | Remote Signal |
| --- | --- |
| Held Open Flag = 1 | Contacts Held Open |

The "Contacts Held Open" state has been included because this state needs to be differentiated from:
1. The contacts being open during a test and reset sequence; and
2. The contacts being open after a ground fault.

The "Held Open" flag is set when the microcontroller receives a stimulus to interrupt the circuit it is protecting by turning the AUTO_RESET signal on and leaving it on. In this way the contacts are held open until further stimulus is received (or the device sees a momentary loss of power). Upon the IGFCI receiving the appropriate input the IGFCI will remove the AUTO_RESET output and the "Held Open" flag. The "Normal Operation" transmission can be used to show the central logger that the contacts are no longer being held open. In this "one way communication" embodiment the IGFCI is not taking commands from the central logger. The stimulus to hold open must come from an input of the microcontroller such as an input that detects when the IGFCI is overheating.

Self-Test—Two Way Communication

In this implementation, the central logger can receive data of the state of the IGFCI and control the communication traffic and also can transmit instructions to the IGFCI including to switch OFF (or ON) and perform a test and reset sequence. Also, the AUTO_RESET can be held HIGH and the IGFCI tripped—even when the IGFCI would normally reset.

IGFCI address+Transmit Current State
IGFCI address+Transmit Time Remaining (in 30 day cycle)
IGFCI address+Annunciation On
IGFCI address+Annunciation Off
IGFCI address+Test and Reset
IGFCI address+Hold Open
IGFCI address+Reset (Note that at no time can the central logger command an IGFCI to hold its contacts closed. An IGFCI can always trip if a ground fault is present.

Described below are the IGFCIs response to commands from the central logger. Note that an IGFCI will not respond unless the command has the same address as the IGFCI.

| | |
| --- | --- |
| Transmit Current State | Upon receiving this command the IGFCI will examine its flags and the variable OLD_INPUT and transmit its state to the central logger. |
| Transmit Time Remaining | If the IGFCI are providing the timing for the 30 day test cycle then the central logger can command each IGFCI to transmit the time remaining in the 30 day cycle. This can be determined from the 30-day counter within each IGFCI. If the central logger is providing the 30-day timing, then this command is redundant. |
| Annunciation On | Upon receiving this command the IGFCI will set its Annunciate Flag, causing it to start annunciating. It will then transmit its current state to confirm the annunciation its on. |
| Annunciation Off | Upon receiving this command the IGFCI will remove the Annunciate Flag. (Note that the only other way to do this is to perform a valid test and reset sequence.) It will then to perform its current state to confirm the annunciation is off. |
| Test and Reset | Upon receiving this command the IGFCI will self-test using the AUTO_TEST and AUTO_RESET outputs as described in the hardware section. Upon completion of a successful self-test the IGFCI will transmit the "Successful Test Sequence" signal. If the self-test is not successful then the IGFCI will transmit its current state, giving a clue to what failed. |

| | |
|---|---|
| Hold Open | Upon receiving this command the IGFCI will turn the AUTO_RESET output high and hold it high, thus holding the contacts of the IGFCI open. Alternatively, the same effect can be achieved by pulsing the AUTO_TEST output, tripping the device through the test circuit. |
| Reset | Upon receiving this command the IGFCI will turn the AUTO_RESET output high for sufficient time to reset the GFCI electronics and then turn off AUTO_RESET. The IGFCI transmits the current state of the IGFCI. Note that Intelligent GFCI with Self-test and Remote Annunciation. This signal is particularly useful for the manual reset version. |

The ability to turn OFF all IGFCIs by sending the command to HOLD_OPEN would be useful in turning power off over a large area, such as during a fire, thus preventing further fires as wiring degrades.

In an IGFCI having manual reset capability, the central logger can decide whether an IGFCI should be reset (close its contacts) when power returns after a power outage. With its battery back up the central logger can retain information on each IGFCI and if the IGFCI had a ground fault or was being held open then it will not send the signal to reset. In fact, it can send a "Hold Open" signal to ensure that the device is not reset by the user until a fault is investigating and cleared at the central logger.

FIGS. 7 to 12 are flow diagrams of an implementation of software for an IGFCI having two-way communications and self-test capabilities. Note that as the IGFCI can self-test, it may more advantageous to start annunciating if the test sequence is not completed within a set time period rather than to start annunciating at the 30-day mark.

Figure 7:
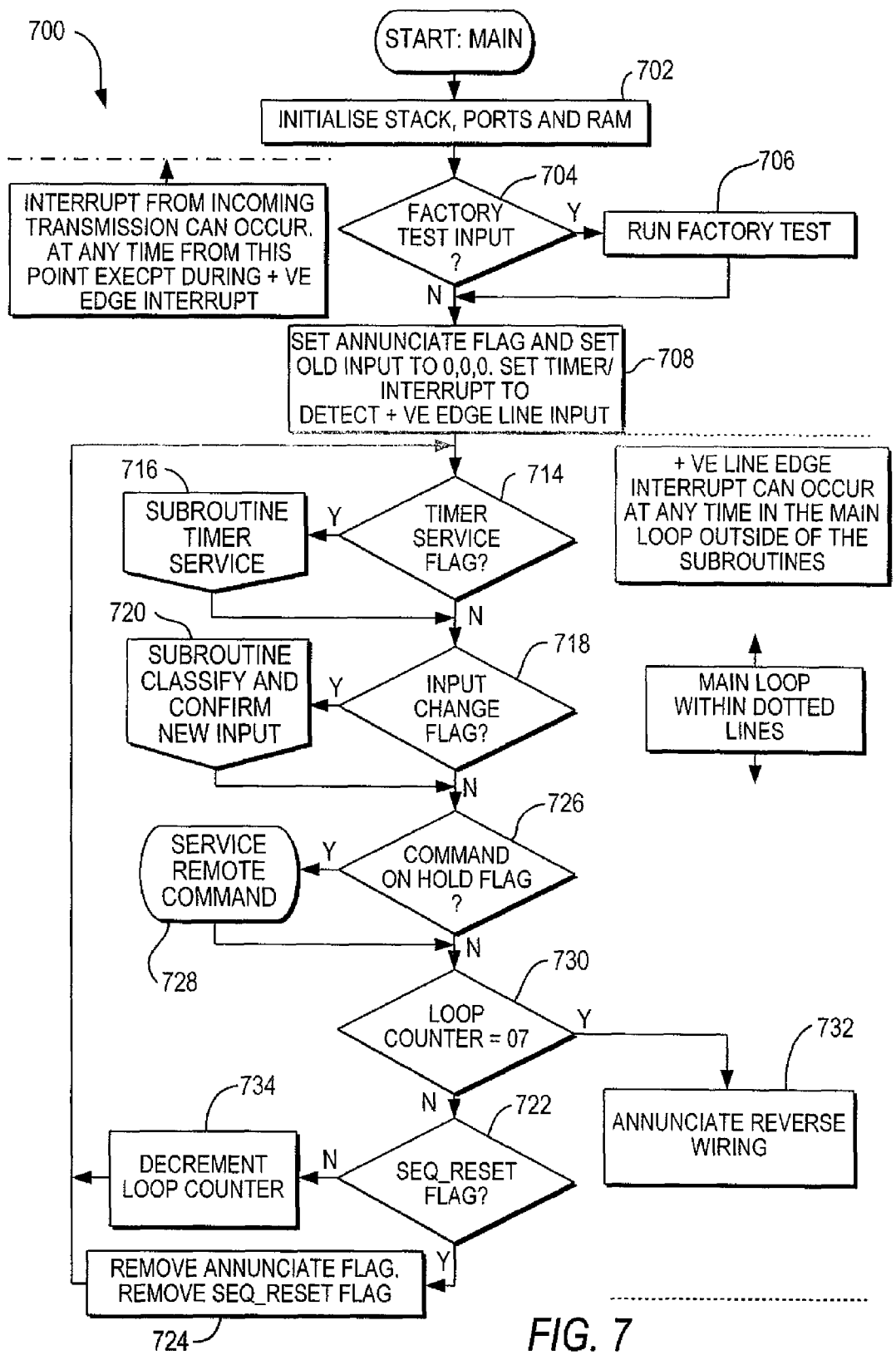
FIGS. 7-12 are flow diagrams for an implementation having two-way communication and self-test functionality.

FIG. 7 illustrates a flow diagram 700 of an implementation of a main program for an IGCI having two-way communications and self-test capabilities. The IGFCI is initialized (step 702) to reset the hardware and software to a known starting position. If a factory test input is applied (step 704), the factory test, described above, is run (step 706). Alternatively, the IGFCI sets (step 708) the annunciate flag, an "old input" to (0,0,0) wherein the 3-bit binary number represents (TEST, LINE, LOAD), and the IGFCI microcontroller to detect a positive going edge on its timer/interrupt pin. When a positive edge is detected on this pin, an interrupt occurs as detailed in FIG. 8, below. From this point, the software enters a loop. The timer service flag is monitored (step 714). When the timer service flag is set the timer service routine is executed (step 716), described below. Alternatively, the software monitors if the input flag has changed (step 718) from the previous (or old) input. If so, the software branches (step 720) to a subroutine, described below, to confirm that a new input has been received and to classify the new input as to the new status of the IGFCI. The IGFCI checks (step 726) for receipt of a command on hold flag from the central logger. If so, the remote command is serviced (step 728) in a subroutine, as described below. If not, a loop counter is checked (step 730) for a 0 (zero) value. If the loop counter is zero, a reverse wiring (or miswiring) is annunciated (step 732). The software then checks for a sequence_reset flag (step 722). If the flag indicates a (user or timer) self-test has not been run, the software decrements (step 734) a loop counter and loops back to monitoring the timer service flag (step 714). Alternatively, the annunciate flag and sequence_reset flag are removed (reset) (step 724) before looping back to monitoring the timer service flag (step 714).

Figure 8:
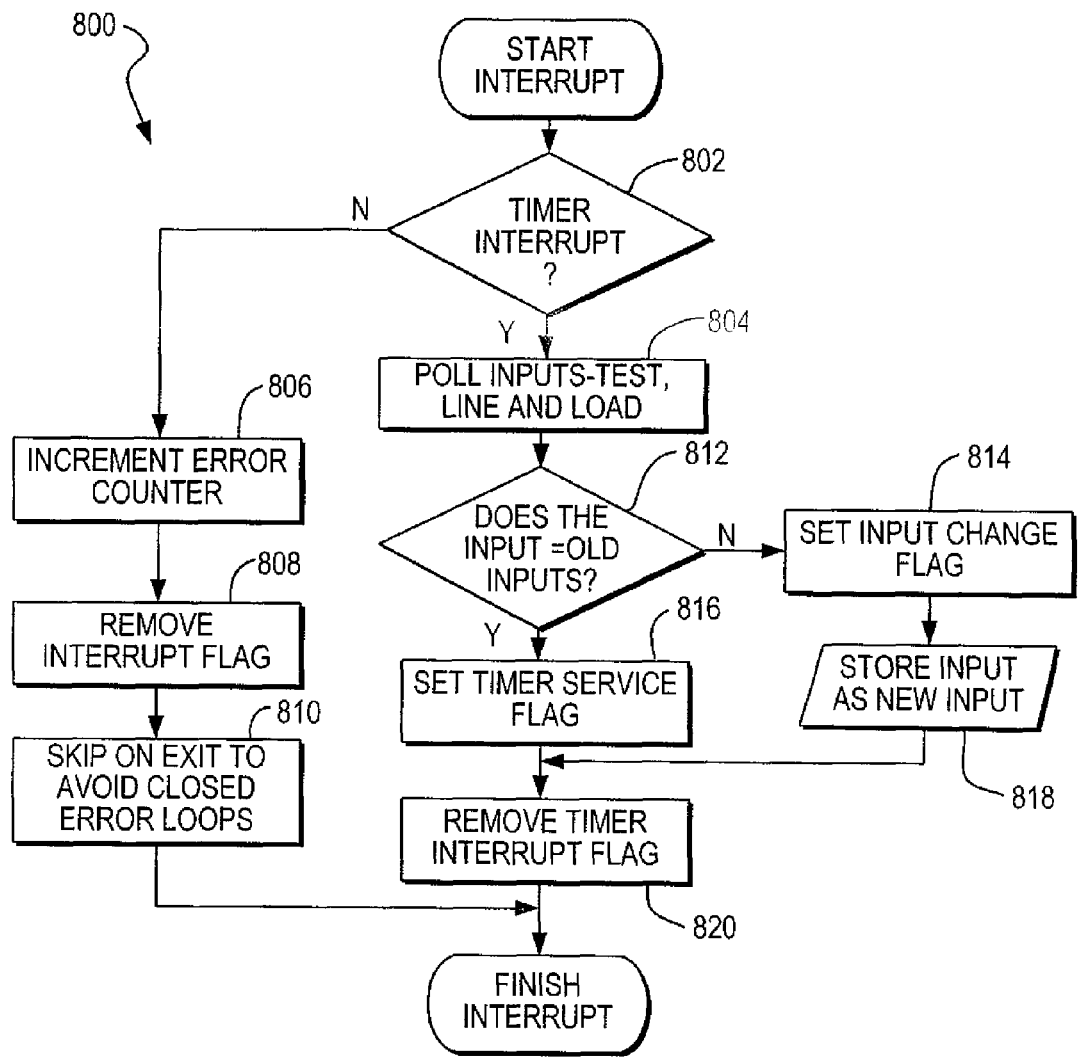

FIG. 8 is a flow diagram 800 illustrating an implementation of the interrupt service routine of the IGFCI device. When an interrupt occurs, it is checked (step 802) whether the interrupt was triggered by a timer interrupt. If not, an error has occurred and an error counter is incremented (step 806) and the interrupt flag is removed (step 808). The program skips on exit (step 810) to avoid accumulating closed loop errors. Alternatively, if the interrupt is not from the timer at (step 802), the input signals ate polled (step 804) by reading the current 3-bit input signals, TEST, LINE and LOAD, through the microcontroller I/O port. If the current 3 bit input is the same when compared (step 812) to the 3 bit input recorded as OLD_INPUT, the timer service flag is set (step 816). If they are not the same, the INPUT_CHANGE flag is set (step 814) and the current 3-bit input is stored as a variable called NEW_INPUT (step 818). The timer interrupt flag is then removed (step 820).

Figure 9:
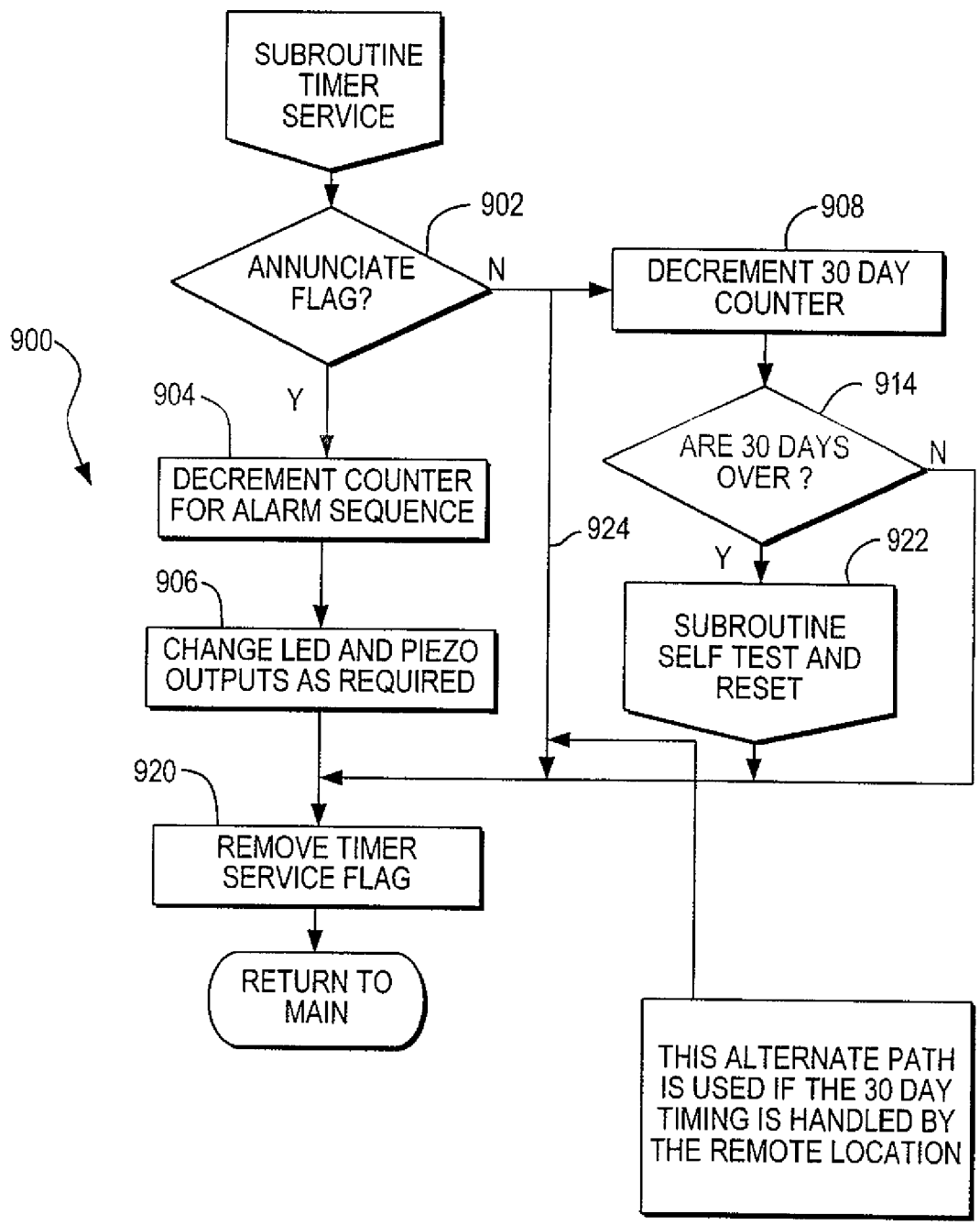

FIG. 9 is a flow chart 900 of an implementation of a timer service subroutine of the IGFCI main routine of FIG. 7. This routine may be entered when the timer service flag is set (See FIG. 7 step 714). The ANNUNCIATE flag is checked (step 902). If the ANNUNCIATE flag is set, the alarm sequence counter is decremented (step 904) and the LED and buzzer output signals are changed as needed (step 906), that is, to create the required audible and visual indicators. If the flag is not set, the 30-day counter is decremented (step 908). If 30-day timing is instantiated by the IGFCI then an internal 30-day timer is checked (step 914). If 30 days have elapsed, a subroutine is called to run a self-test and reset (step 922). In an alternative implementation, the 30-day timing may be monitored by the central (or remote) location. In this implementation, steps 908, 914 and 922 are skipped. Before exiting, the timer service flag is reset (step 920).

Figure 10A:
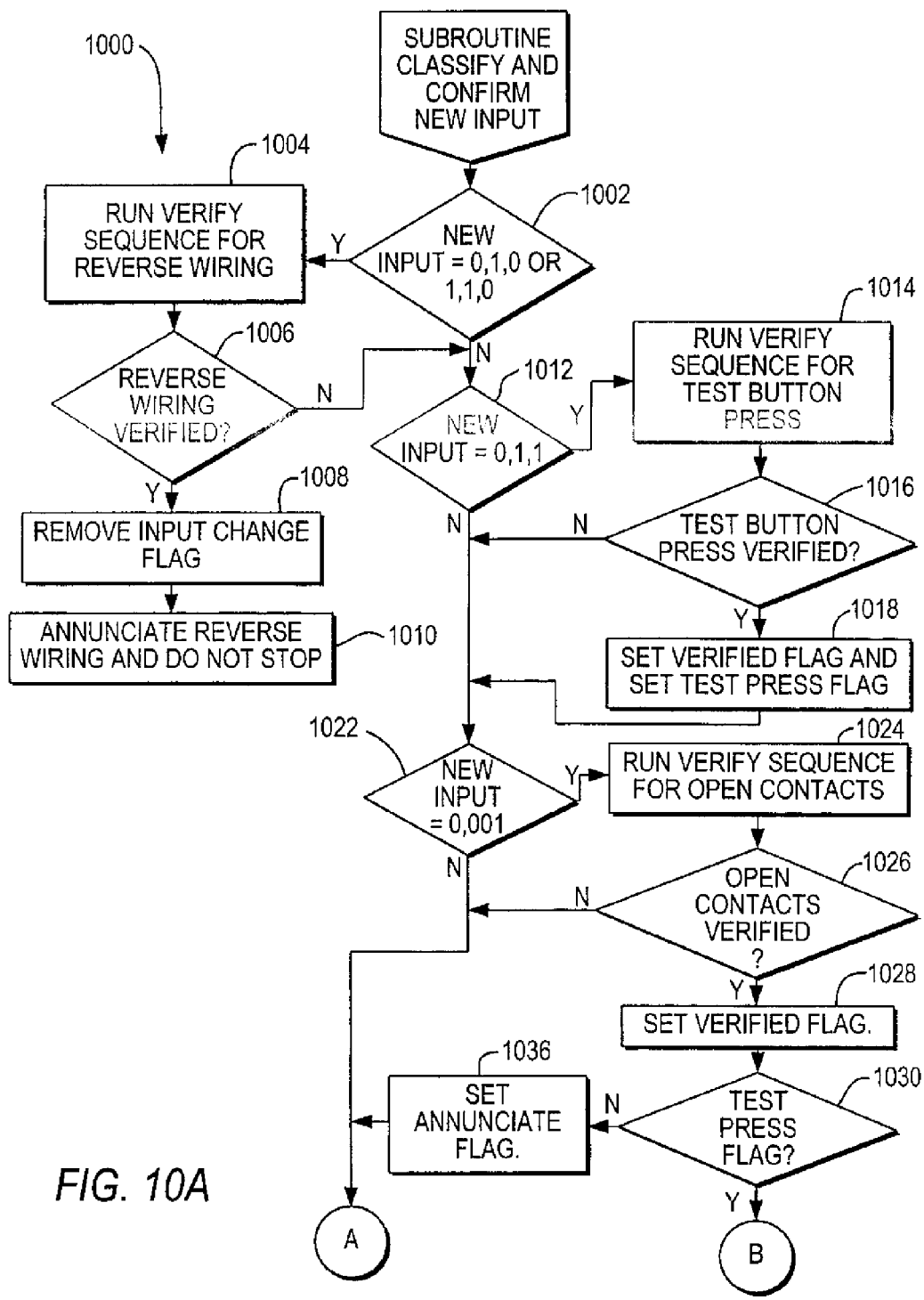
Figure 10B:
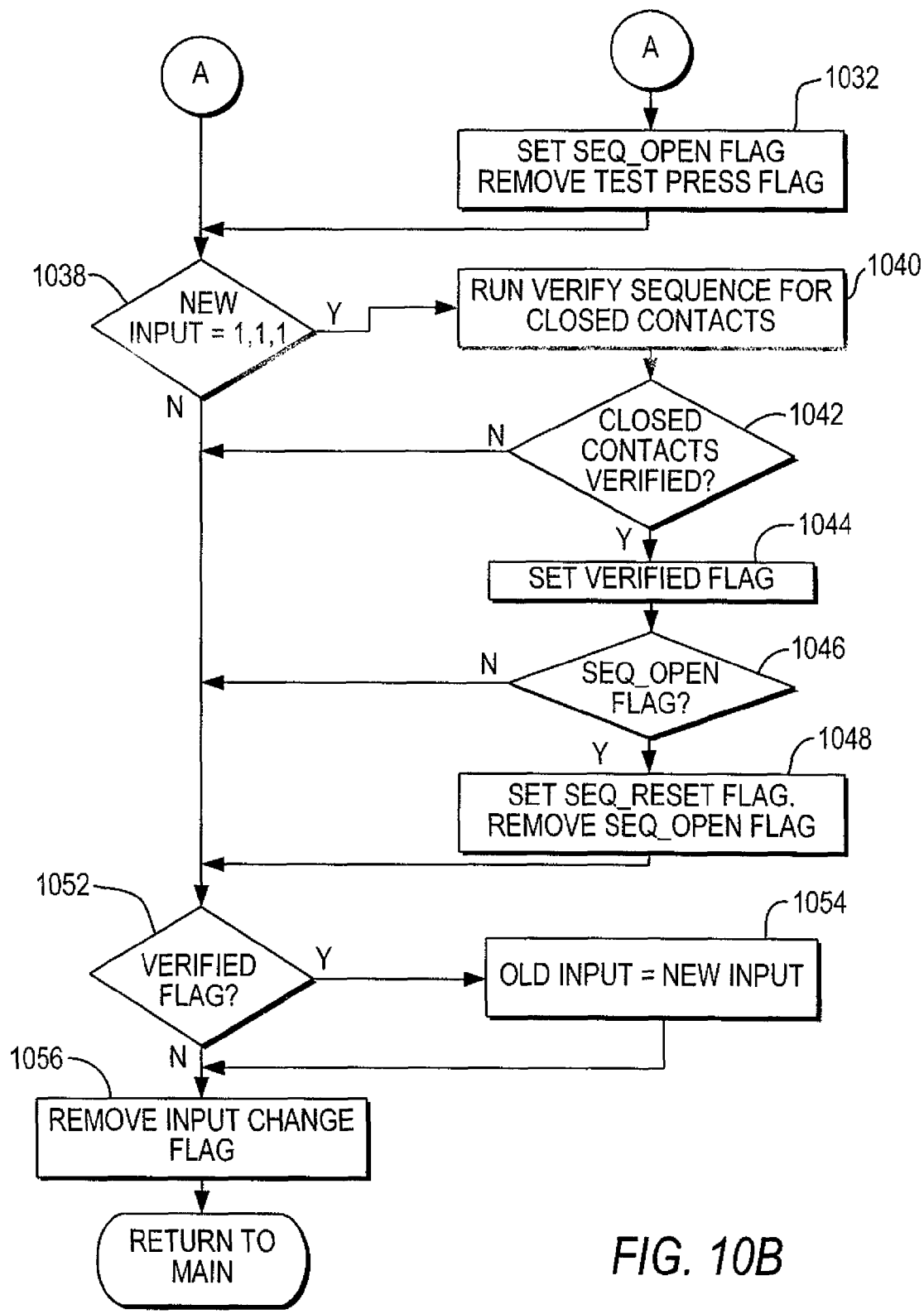

FIGS. 10A and 10B illustrate flow diagrams 1000 for an implementation of a routine for classifying and confirming new inputs. The variable NEW_INPUT is checked (step 1002) for the value (0, 1, 0) or (1, 1, 0), that is, a line/load reversal condition. If so, the device verifies (step 1004) whether a miswiring condition actually exists by, for example, sampling the inputs multiple times. If a miswiring condition is verified (step 1006), then the input change flag is removed (reset) (step 1008) and audible indicators are annunciated (step 1010) continuously and cannot be stopped other than by removing electrical power from the device. If a miswiring condition is not verified (step 1006), the device checks (step 1012) if the variable NEW_INPUT equals (0, 1, 1). If so, the device verifies (step 1014) if the test button was pressed. If a test button press is verified (step 1016), the VERIFIED and TEST PRESS flags are set (step 1018). If the test button press is not verified (step 1016), the NEW_INPUT variable is checked (step 1022) if it equals (0, 0, 1), that is, open power interrupting contacts. If so, the device verifies (step 1024) whether the contacts are open. If the open contacts are verified (step 1026), the VERIFIED and ANNUNCIATE flags are set (step 1028) and a contacts open after test signal is transmitted to the central logger. It is then checked whether the test press flag is set (step 1030). If so, the SEQ_OPEN flag is set and the test press flag is removed (reset) (step 1032). If the test press flag set is not verified (step 1030), the annunciate flag is set (step 1036).

The variable NEW_INPUT is checked (step 1038) for a value of (1, 1, 1), that is, closed power interrupting contacts. If so, the device verifies (step 1040) whether the contacts are closed. If the closed contacts are verified (step 1042), the VERIFIED flag is set (step 1044). It is then checked whether the SEQ_OPEN flag is set (step 1046). If so, the SEQ_RESET flag is set and the SEQ_OPEN flag is removed (reset) (step 1048).

Before the routine returns, the VERIFIED flag is checked (step 1052) as set. If so, the variable OLD_INPUT is set to the same value as the variable NEW_INPUT (step 1054). The input change flag is reset (step 1056) and the subroutine returns to the calling program.

Figure 11:
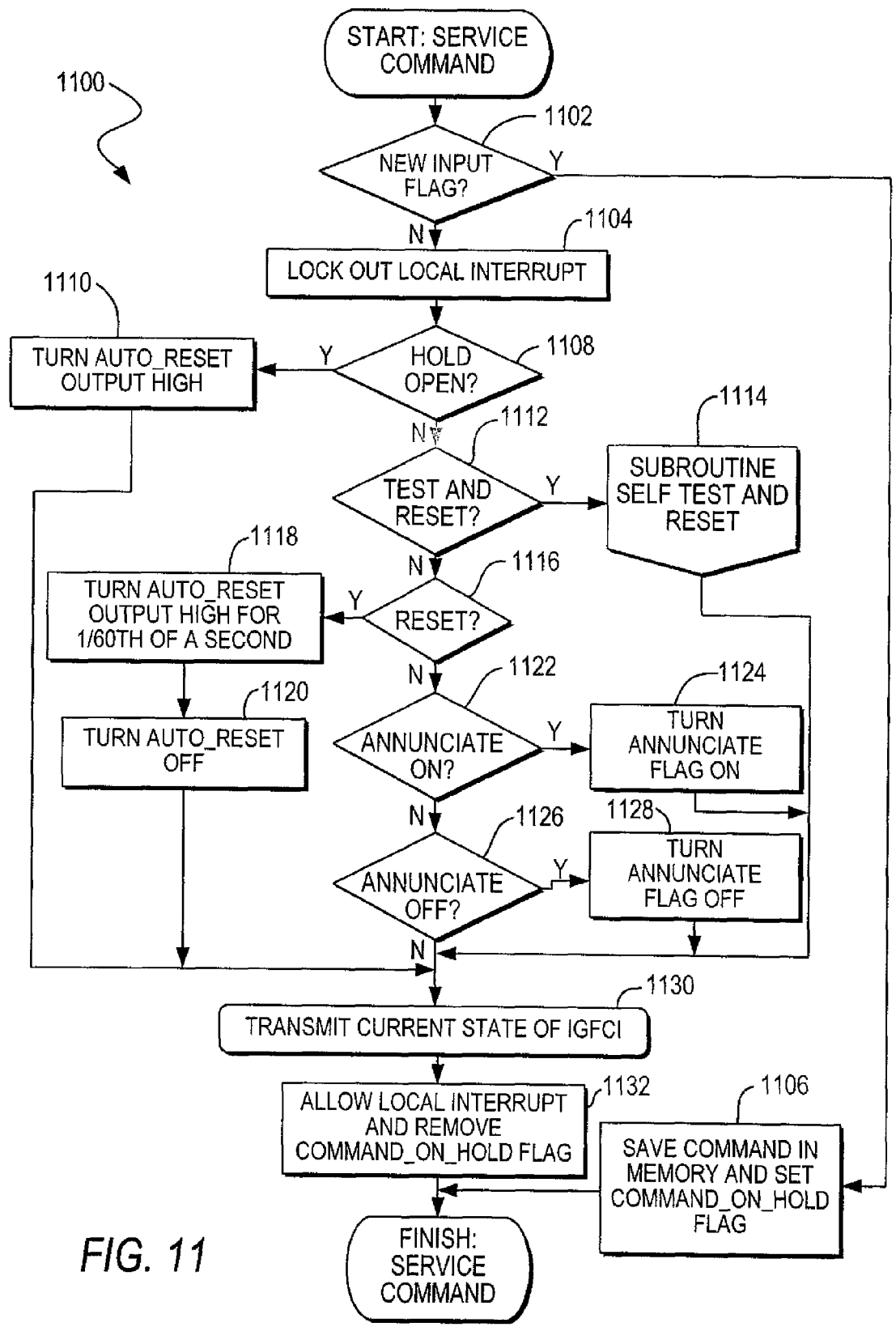

FIG. 11 illustrates a flow diagram 1100 for an implementation of a service-command subroutine. The subroutine responds to a command received from the central logger. The IGFCI checks (step 1102) for a NEW_INPUT flag, indicating a change in state of the IGFCI. If so, the received command is stored in IGFCI memory and a COMMAND_ON_HOLD flag is set (step 1106) so that the command may be executed at a later time. If not, the local interrupts are locked out (step 1104). The command is checked (step 1108) for instructions to hold open the power-interrupting contacts. If so, the AUTO_RESET output is set to HIGH (step 1110). If not, the IGFCI checks (step 1112) the command for an instruction to perform a test and reset of the IGFCI. If so, a subroutine for a self-test and reset (step 1114), described below, is run. If not, the command is checked (step 1116) for an instruction to reset the IGFCI. If so, the AUTO-RESET output is set ON (step 1118) for one sixtieth (1/60), that is, approximately one cycle of power and then the AUTO_RESET is set OFF (step 1120). If not, the command is checked (step 1122) for an instruction to set ANNUNCIATE ON. If so, the ANNUNCIATE flag is set ON (step 1124). If not, the command is checked (step 1126) for an instruction to set ANNUNCIATE OFF. If so, the ANNUNCIATE flag is set OFF (step 1128). If not, and after the other above instructions have been checked, the IGFCI transmits (step 1130) the current state of the IGFCI to the central logger. The local interrupts are enabled and the COMMAND_ON_HOLD flag is removed (step 1132) before the subroutine ends.

Figure 12:
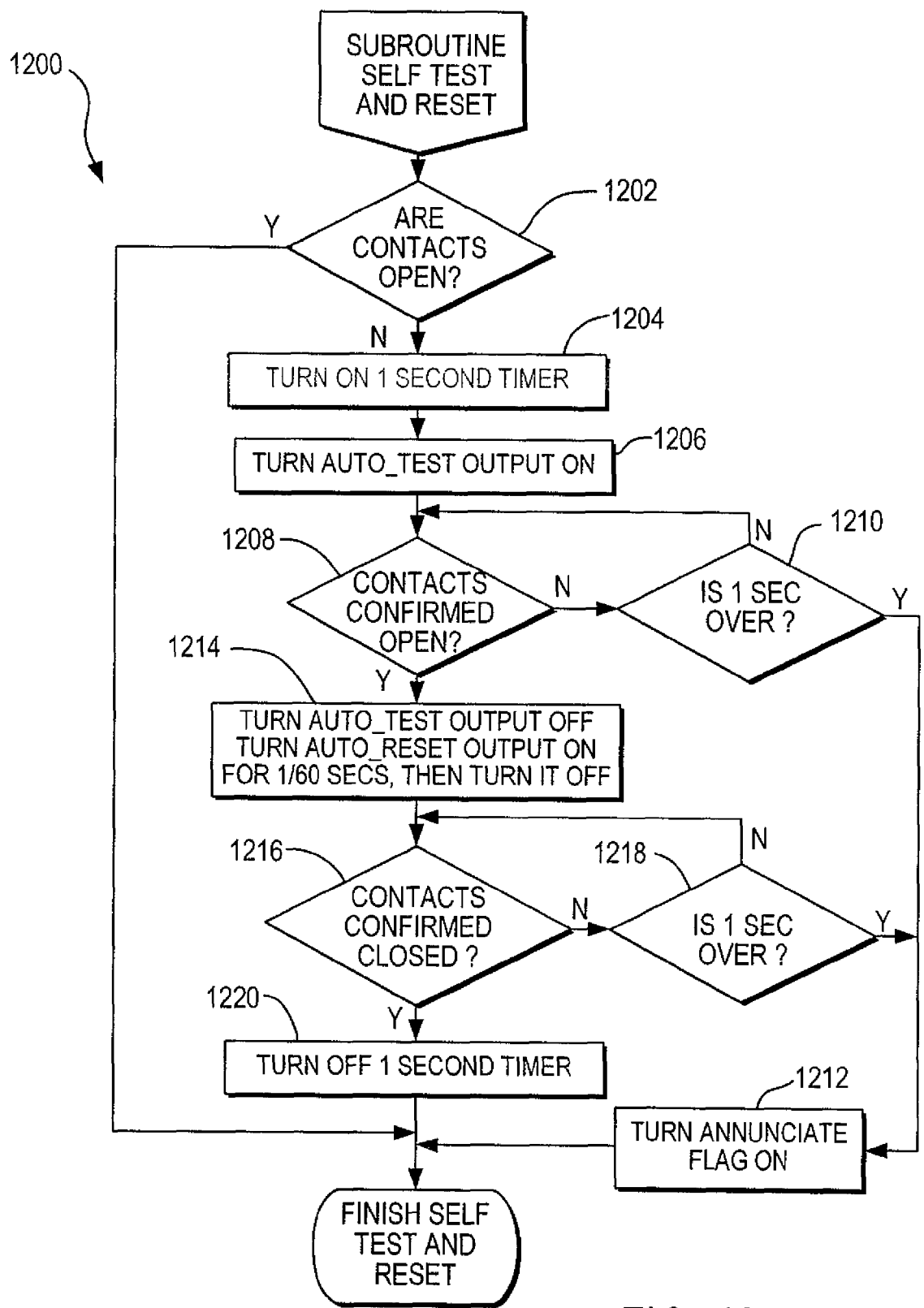

FIG. 12 illustrates a flow diagram 1200 for an implementation of a self-test and reset subroutine. The power-interrupting contacts are checked (step 1202) for an open condition, which indicates that the IGFCI has already been triggered. If so, the self-test is not run and the subroutine returns to the calling program. If not, a timer, one (1) second for example, is started (step 1204). The AUTO_TEST output is turned ON (step 1206) to simulate a fault condition to the IGFCI. To confirm triggering of the IGFCI, the power-interrupting contacts are checked (step 1208) for an open condition. The IGFCI continues to monitor the power-interrupting contacts until the 1-second timer times out (step 1210). If the timer times out (step 1210) and the power-interrupting contacts have not opened, the ANNUNCIATE flag is turned ON (step 1212). If the power-interrupting contacts open (step 1208), the AUTO_TEST output is turned OFF and the AUTO_RESET output is turned ON for one-sixtieth (1/60) of a second and then turned back OFF. The power-interrupting contacts are checked (step 1216) for closure. The IGFCI continues to monitor the power-interrupting contacts until the 1-second timer times out (step 1218). If the timer times out (step 1218) and the power-interrupting contacts have not closed, the ANNUNCIATE flag is turned ON (step 1212). If the power-interrupting contacts are confirmed closed (step 1216), the 1-second timer is turned OFF (step 1220) and the subroutine returns to the calling program.

Other embodiments are within the scope of the following claims.

What is claimed is:

1. A fault circuit interrupting device comprising:
   a) a set of contacts to make and break a conductive path between line and load side conductors;
   b) a self test-circuit to test and reset the fault circuit interrupter and to transmit the results thereof to a remote device said circuit comprising:
      i) a microcontroller;
      ii) a communications circuit coupled to said microcontroller, said communications circuit disposed to communicate with a remote device the status of the fault circuit interrupter;
   c) a fault circuit having an input coupled to an output of said microcontroller, said fault circuit disposed to receive a disconnect signal from said microcontroller and for selectively opening said set of contacts to conduct a self test;
   d) a relay configured to open said contacts when power is removed comprising:
      i) at least one relay coil configured to open said contacts when power is removed from said coil;
      ii) at least one silicon controlled rectifier configured to selectively allow power to said at least one relay coil;
      iii) at least one transistor, in communication with said silicon controlled rectifier and with said microcontroller, said at least one transistor configured to selectively provide power to said silicon controlled rectifier to selectively actuate said silicon controlled rectifier to control said at least one relay coil to selectively open and close said contacts.

2. The fault circuit interrupter device according to claim 1, wherein said circuit comprises bi-directional transmission capability.

3. The fault circuit interrupter device according to claim 1, further comprising:
   a microcontroller configured to re-close the contacts after the contacts have been opened.

4. The fault circuit interrupter device according to claim 3, further comprising a visual indicator.

5. The ground fault circuit interrupter device according to claim 3, further comprising an audible indicator.

6. The fault circuit interrupter device according to claim 1, wherein said self test circuit is configured to generate an automatic test or an automatic reset on said fault circuit interrupter.

7. A method for testing a fault circuit interrupter comprising:
   sending at least one control signal from a control device comprising a microcontroller to the fault circuit interrupter comprising an integrated circuit to create at least one condition;
   tripping a set of contacts via a signal from said integrated circuit;
   sensing at least one response to said at least one control signal; and
   transmitting a report comprising said at least one response to a remote device including reporting whether there has been a miswire condition; and
   closing said set of contacts by applying power to a relay coil by providing power to a transistor to remove power from a silicon controlled rectifier to allow power to flow into a relay coil thereby closing said contacts after said contacts have been tripped.

8. The method according to claim 7 wherein said control device, performs the following step:
   determining whether a self test has been successfully completed.

9. The method as in claim 7, further comprising the step of analyzing a leakage condition in a plurality of electrical devices electrically coupled to the fault circuit interrupting device thereby providing a single analyzing point of reference for all downstream loads, by analyzing a magnitude and time of leakage.

10. The method as in claim 9, further comprising the step of storing data relating to the leakage condition to create a range of acceptable values for voltage, frequency and current.

11. The method as in claim 10, further comprising the step of determining if there is a deviation from said range of acceptable values.

12. The method as in claim 11, wherein if there is a deviation determined, the method further includes the step of tripping the contacts.

13. The method as in claim 11, wherein if a deviation is determined, the method further includes the step of notifying a remote central logger.

14. The fault circuit interrupting device as in claim 1, wherein said microcontroller is configured to analyze a magnitude and time of leakage.

15. The fault circuit interrupting device as in claim 1, wherein the microcontroller further comprises a memory, wherein said memory is used to store a set of data relating to the leakage condition.

16. The fault circuit interrupting device as in claim 15, wherein said microcontroller is configured to determine if there is a deviation from said set of data.

17. The fault circuit interrupting device as in claim 16, wherein said microcontroller is configured to perform at least one the following functions:
   opening said contacts after discovering a deviation in a leakage condition; and
   communicating to a remote central logger a deviant leakage condition.

18. The device as in claim 1, wherein said communications circuit is configured to receive at least one remote signal for initiating a self-test.

19. The device as in claim 1, wherein said communications circuit is configured to receive a remote signal via at least one of the following protocols: power line, or wireless.

20. The process as in claim 7, further comprising the step of performing bi-directional communication with a remote central logger a status of the device as well as receiving instructions for conducting a self-test from said remote central logger.

* * * * *